(12) United States Patent
Tateuchi et al.

(10) Patent No.: US 8,587,560 B2
(45) Date of Patent: Nov. 19, 2013

(54) DISPLAY APPARATUS

(75) Inventors: Mitsuru Tateuchi, Kanagawa (JP);
Ryoichi Tsuzaki, Kanagawa (JP);
Tsutomu Harada, Kanagawa (JP);
Kazunori Yamaguchi, Kanagawa (JP)

(73) Assignee: Japan Display West Inc., Aichi-Ken (JP)

( * ) Notice: Subject to any disclaimer, the term of this patent is extended or adjusted under 35 U.S.C. 154(b) by 1022 days.

(21) Appl. No.: 12/263,858

(22) Filed: Nov. 3, 2008

(65) Prior Publication Data

US 2009/0284505 A1 Nov. 19, 2009

(30) Foreign Application Priority Data

Nov. 26, 2007 (JP) ................ 2007-304829

(51) Int. Cl.
G06F 3/042 (2006.01)
G06F 3/041 (2006.01)
G06F 3/038 (2013.01)
G09G 5/00 (2006.01)

(52) U.S. Cl.
USPC ............ 345/175; 345/173; 345/207

(58) Field of Classification Search
USPC ............................................ 345/175
See application file for complete search history.

(56) References Cited

U.S. PATENT DOCUMENTS

| | | | |
|---|---|---|---|
| 7,301,571 B2 | 11/2007 | Kobayashi et al. | |
| 7,525,082 B2 * | 4/2009 | Itagaki | 250/221 |
| 2006/0192766 A1 * | 8/2006 | Nakamura et al. | 345/173 |
| 2007/0211024 A1 * | 9/2007 | Kwon et al. | 345/156 |
| 2007/0222766 A1 * | 9/2007 | Bolender | 345/173 |
| 2007/0268241 A1 | 11/2007 | Nitta et al. | |
| 2008/0122803 A1 * | 5/2008 | Izadi et al. | 345/175 |
| 2010/0013813 A1 * | 1/2010 | Katoh et al. | 345/207 |

FOREIGN PATENT DOCUMENTS

| | | |
|---|---|---|
| JP | 09-113884 | 5/1997 |
| JP | 10-206839 | 8/1998 |
| JP | 2000-132317 | 5/2000 |
| JP | 2003-149630 | 5/2003 |
| JP | 2004-018819 | 1/2004 |
| JP | 2004-222177 | 8/2004 |
| JP | 2004-304282 | 10/2004 |
| JP | 2006-301864 | 11/2006 |
| JP | 2007-309984 | 11/2007 |
| JP | 2004-318067 | 11/2008 |

OTHER PUBLICATIONS

Japanese Office Action issued on Sep. 10, 2009, for corresponding Japanese Patent Application JP 2007-304829.

* cited by examiner

*Primary Examiner* — Charles V Hicks
(74) *Attorney, Agent, or Firm* — K&L Gates LLP

(57) ABSTRACT

A display apparatus is provided and includes display cells each having a display circuit, light receiving cells each having a photosensor configured to receive light from an outside, and display signal lines. The display cells and the light receiving cells are arranged in a row direction perpendicular to the display signal lines and in a column direction parallel with the display signal lines. Also, the light receiving cells in each row are displaced in the row direction between every two adjacent rows in a column direction.

12 Claims, 39 Drawing Sheets

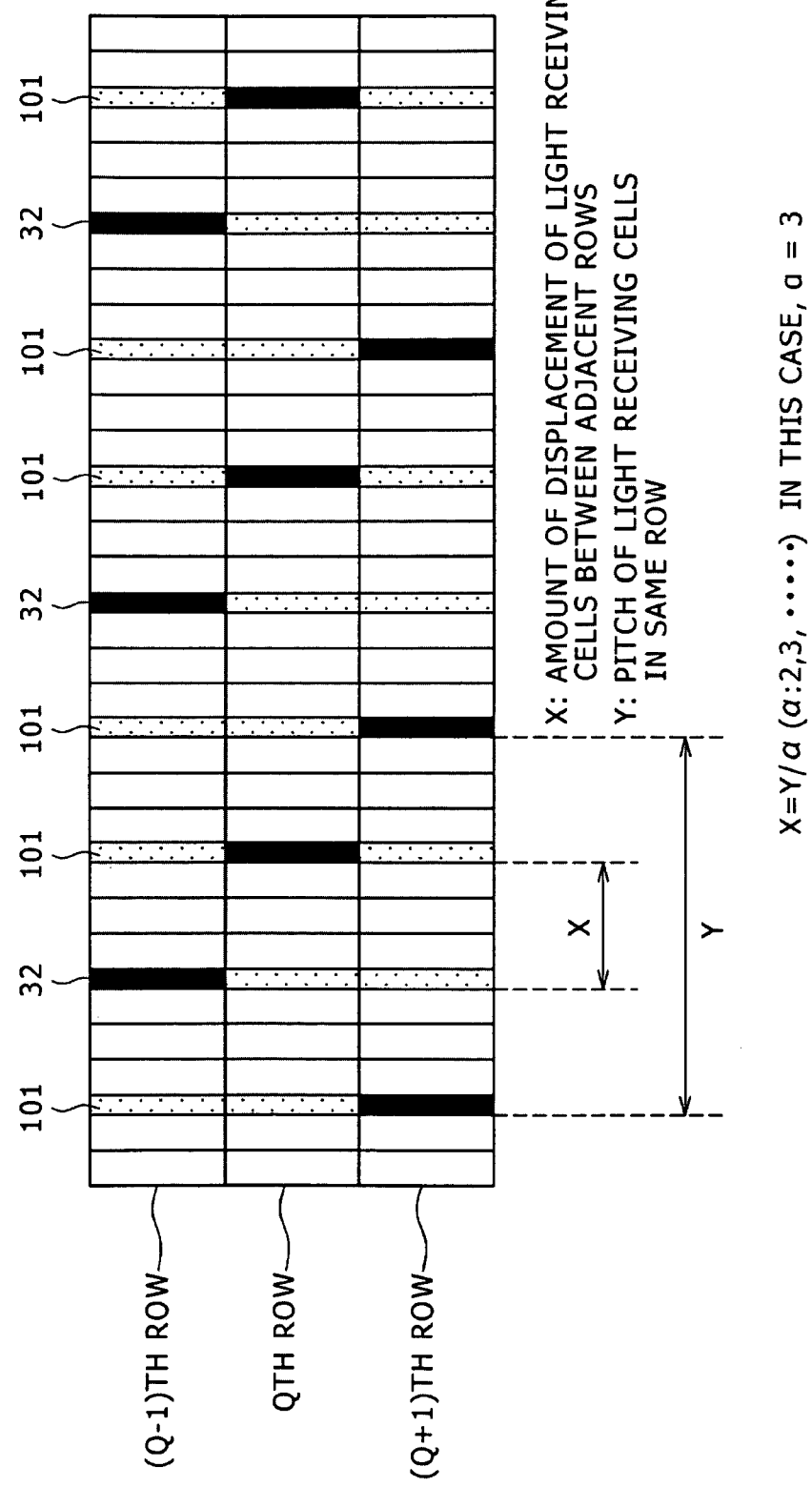

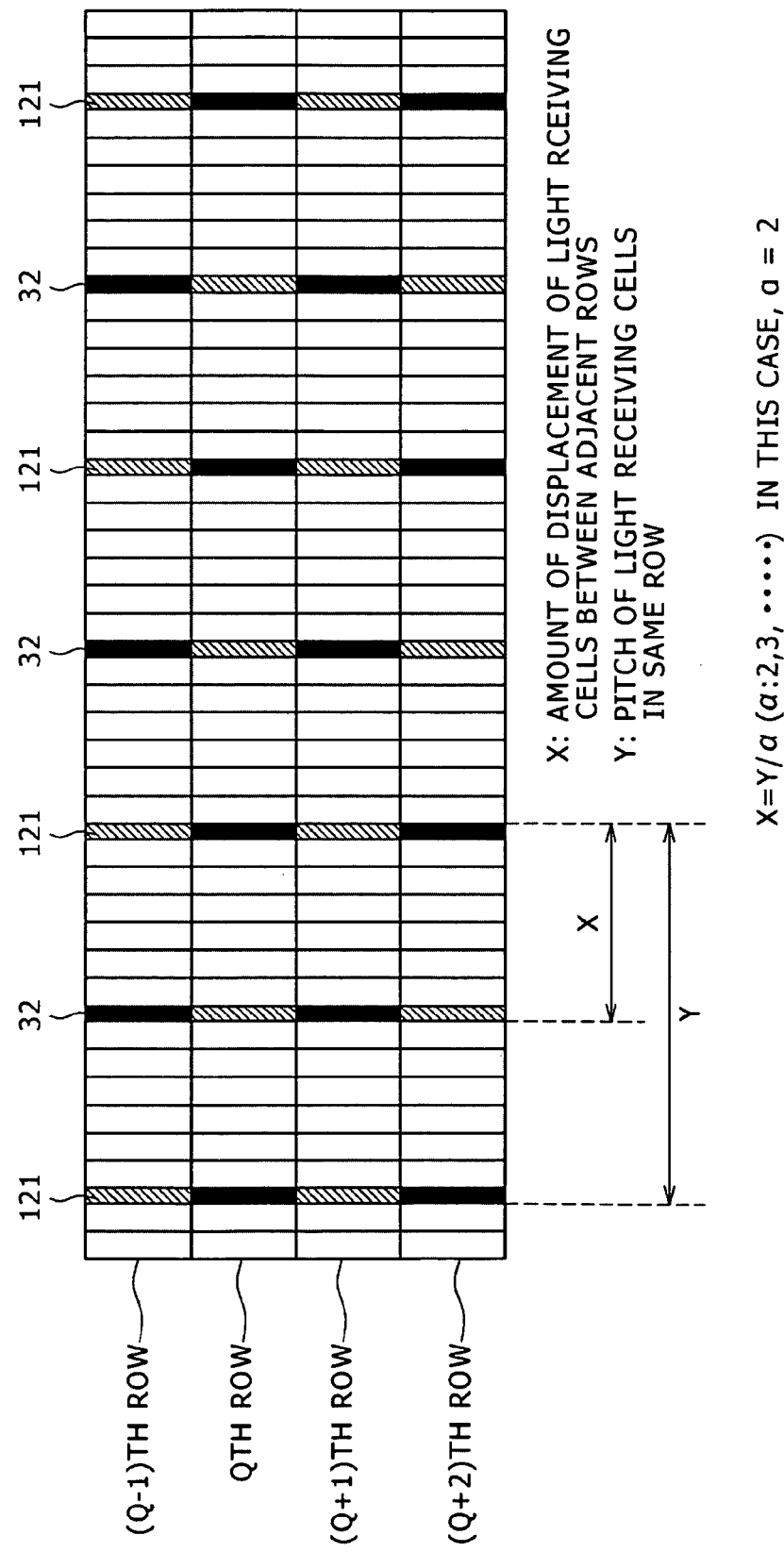

DISPLAY APPARATUS

CROSS REFERENCES TO RELATED APPLICATIONS

The present application claims priority to Japanese Patent Application JP 2007-304829, filed in the Japan Patent Office on Nov. 26, 2007, the entire contents of which is being incorporated herein by reference.

BACKGROUND

There have been proposed a variety of display apparatuses in which display circuits and light receiving circuits are arranged on the same substrate and which are capable of displaying an image and also of receiving light from an outside (see, for example, Japanese Patent Laid-Open No. 2004-318067 and Japanese Patent Laid-Open No. 2004-318819). Each of the light receiving circuits detects light that is emitted from an object (e.g., a pen) that has an external light source such as a light emitting diode (LED), light that is originally emitted from a backlight and then reflected and returned from a finger or pen that is in contact with a screen, or the like, and supplies a light receiving signal as a result of the detection of the light to a signal processing circuit or the like in a subsequent stage.

The signal processing circuit or the like in the subsequent stage, for example, analyzes a location on the screen which a user has specified with the finger or the pen, thereby analyzing information entered by the user. Thus, the more light receiving circuits are arranged on the substrate, the higher detection precision is achieved. However, the more light receiving circuits are arranged on the substrate, the greater a load for processing the light receiving signal becomes. Therefore, when there is not a need for a high light receiving resolution, the light receiving resolution is sometimes set at a lower value than that of a display resolution by thinning the light receiving circuits arranged on the substrate.

However, thinning the light receiving circuits arranged on the substrate might produce a problem. Even if the light receiving circuits are thinned, acquisition of location information will not suffer a significant problem when detecting a relatively large object such as the finger. However, when the detection target object is a small object such as a stylus or a pen with a fine tip, a loss of light receiving information because of the thinning of the light receiving circuits will be so great that the location information of the detection target object cannot be detected accurately.

SUMMARY

The present disclosure relates to a display apparatus. In particular, the present application relates to a display apparatus that allows accurate detection of a location of a detection target object (i.e., an object to be detected) even with a reduced light receiving resolution.

The present embodiments address the above-identified, and other problems associated with existing methods and apparatuses, and allows accurate detection of the location of the detection target object even with a reduced light receiving resolution.

According to one embodiment, there is provided a display apparatus including: display cells each having a display circuit; light receiving cells each having a photosensor; and display signal lines, wherein, the display cells and the light receiving cells are arranged in a row direction perpendicular to the display signal lines and in a column direction parallel with the display signal lines, and the light receiving cells in each row are displaced in the row direction between every two adjacent rows in a column direction.

According to another embodiment, there is provided a display apparatus including: display cells each having a display circuit; light receiving cells each having a photosensor; and display signal lines, wherein, the display cells and the light receiving cells are arranged in a row direction perpendicular to the display signal lines and in a column direction parallel with the display signal lines, and the light receiving cells in each row are displaced in the column direction between every two adjacent columns in a row direction.

According to one embodiment, the light receiving cells in each row are displaced in the row direction between every two adjacent rows in a column direction in the display apparatus.

According to another embodiment, the light receiving cells in each column are displaced in the column direction between every two adjacent columns in a row direction.

According to the above-described embodiments, it is possible to detect the location of the detection target object accurately even with a reduced light receiving resolution.

Additional features and advantages are described herein, and will be apparent from the following Detailed Description and the figures.

BRIEF DESCRIPTION OF THE FIGURES

FIGS. 37, 38, and 39 are illustrations for explaining relationships between an amount X of displacement of the light receiving cells and a pitch Y of the light receiving cells.

DETAILED DESCRIPTION

Figure 1:
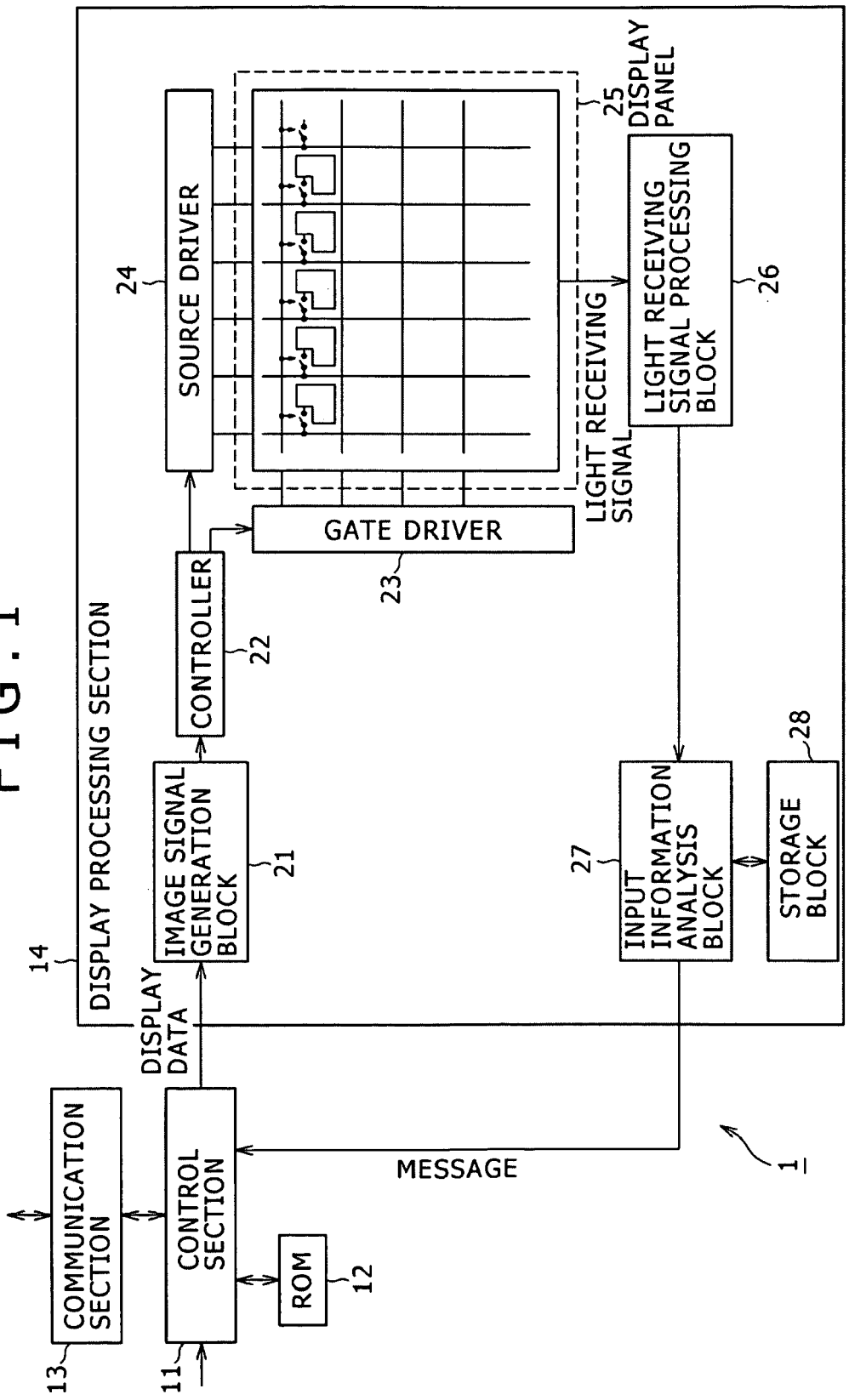
FIG. 1 illustrates an exemplary structure of an information processing apparatus according to one embodiment.

FIG. 1 shows an exemplary structure of an information processing apparatus 1 according to one embodiment.

Figure 2:
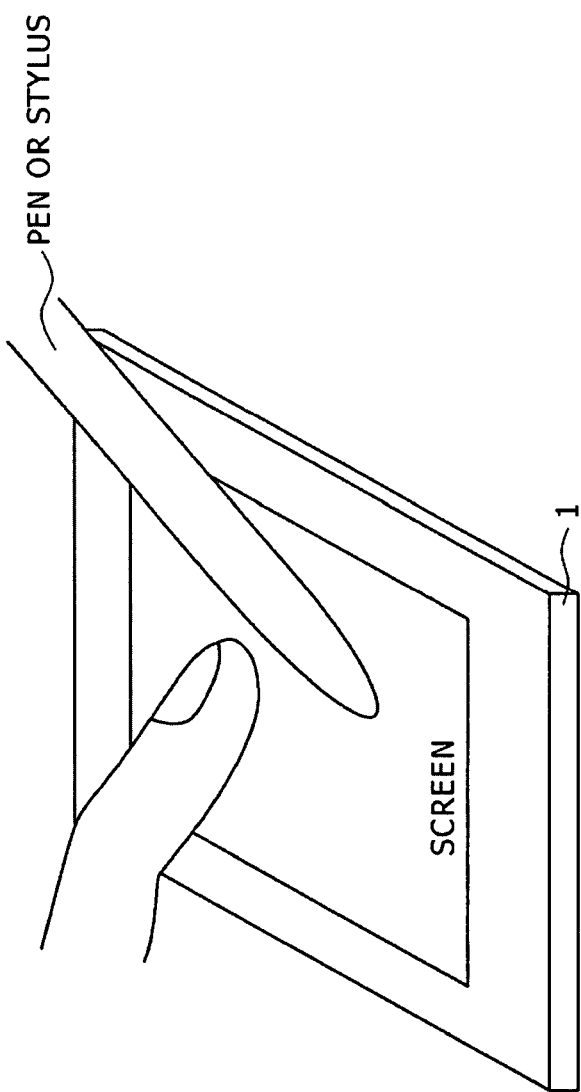
FIG. 2 illustrates an operation when entering information into the information processing apparatus.

The information processing apparatus 1 as shown in FIG. 1 is a cellular phone, a digital still camera, a personal digital assistant (PDA), or the like which at least includes a display apparatus for displaying given information as an image and which performs specific information processing such as a call process, an imaging process, or a data transmission/reception process. In addition, as shown in FIG. 2, a user is able to enter specific information into the information processing apparatus 1 by specifying a point on a screen of the display apparatus with a finger, a pen, a stylus, or the like.

The information processing apparatus 1 includes a control section 11, a ROM 12, a communication section 13, and a display processing section 14. The display processing section 14 corresponds to the aforementioned display apparatus, and includes an image signal generation block 21, a controller 22, a gate driver 23, a source driver 24, a display panel 25, a light receiving signal processing block 26, an input information analysis block 27, and a storage block 28.

The control section 11 controls an overall operation of the information processing apparatus 1 based on a control program stored in the ROM (Read Only Memory) 12. For example, based on an instruction from another module (not shown) or data received by the communication section 13, the control section 11 supplies display data to be displayed on the display panel 25 to the image signal generation block 21. In addition, as described below, in accordance with a message supplied from the input information analysis block 27, the control section 11 updates the display data to be supplied to the image signal generation block 21, or supplies data to the communication section 13 or the other module, for example.

In the case where the information processing apparatus 1 is the cellular phone, examples of the other module include a module that performs a call function. In the case where the information processing apparatus 1 is the digital still camera, examples of the other module include a module that performs an imaging function. The communication section 13 communicates with a variety of devices in a wired or wireless manner via a network such as the Internet, and supplies data acquired to the control section 11. In the case where the information processing apparatus 1 does not need to communicate with any external entity, the communication section 13 may be omitted.

The image signal generation block 21 generates an image signal for displaying an image corresponding to the display data supplied from the control section 11, and outputs the generated image signal to the controller 22, which controls drive of the display panel 25.

The controller 22 controls drive of the gate driver 23 and the source driver 24. The gate driver 23 controls on (connection) and off (disconnection) of a switching element arranged in each pixel in the display panel 25. The source driver 24 operates in conjunction with the drive of the gate driver 23 to supply a voltage signal (hereinafter referred to as a "display signal") corresponding to the image signal to each pixel. The gate driver 23 is connected to each pixel in the display panel 25 via a display selection line 52 (see FIG. 3). Meanwhile, the source driver 24 is connected to each pixel in the display panel 25 via a display signal line 51 (see FIG. 3).

The display panel 25 is, for example, a liquid crystal display (LCD) that has an m by n matrix of pixels where m is the number of rows and n is the number of columns. That is, m rows of pixels are arranged side by side in a column direction, whereas n columns of pixels are arranged side by side in a row direction. A transmittance of light from the backlight (not shown) is changed at a liquid crystal layer to display given information as an image. Note that the term "row direction" as used herein refers to a direction perpendicular to the display signal lines 51 (see FIG. 3) connected to the source driver 24, whereas the term "column direction" as used herein refers to a direction parallel with the display signal lines 51.

Further, the display panel 25 contains photosensors, and receives the light that is originally emitted from the backlight and then reflected and returned from the finger, pen, or the like that is in contact with or located close to a surface of an uppermost part of the display panel 25 to obtain a light receiving signal. Then, the display panel 25 supplies the light receiving signal to the light receiving signal processing block 26. Thus, the display panel 25 is provided with display circuits for displaying the image and light receiving circuits for detecting the light as input information.

Each pixel, which is a unit (a display unit of the image) of a display resolution, is composed of three pixels, i.e., red (R), green (G), and blue (B) pixels. Therefore, to be precise, the total number of pixels that constitute the display panel 25 is 3m×n. Hereinafter, while each pixel that is composed of the three pixels, i.e., the R, G, and B pixels, and which is the unit of the display resolution will be referred to as a "pixel," whereas each of the R, G, and B pixels that constitute each pixel will be referred to as a "display cell."

The light receiving signal processing block 26 subjects the light receiving signal supplied from the display panel 25 to a predetermined amplification process, filtering process, image processing, or the like, and supplies the resulting light receiving signal as shaped to the input information analysis block 27.

The input information analysis block 27 uses a light receiving image generated from the light receiving signal to analyze a location (i.e., a contact location) on the screen which has been specified with the finger or pen, thereby analyzing the information entered by the user. The input information analysis block 27 supplies a result of this analysis to the control section 11 as the message. For example, suppose that an Nth-frame light receiving signal is supplied from the light receiving signal processing block 26 to the input information analysis block 27. Then, the input information analysis block 27 compares a light receiving image generated from the Nth-frame light receiving signal with a previous (i.e., (N−1)th-frame) light receiving image as stored in the storage block 28 to calculate a difference between the two light receiving images. Then, based on the difference calculated, the input information analysis block 27 analyzes a motion of the contact location in relation to the previous frame. In the case where there are a plurality of contact locations, the input information analysis block 27 makes an analysis with respect to each of the plurality of contact locations. Further, the input information analysis block 27 refers to information, stored in the storage block 28, about a change in the contact location between a frame of a predetermined frame period before and a current frame to determine a message concerning the detection of the contact location to be supplied to the control section 11.

In the display panel 25 of the information processing apparatus 1 having the above-described structure, one light receiving circuit is provided for a plurality of pixels, so that a light receiving resolution is lower than the display resolution.

Hereinafter, an arrangement in the case where the light receiving resolution and the display resolution are identical will be described first by way of contrast, and thereafter, arrangements adopted in the display panel 25, i.e., arrangements in the case where the light receiving resolution is lower than the display resolution, will be described.

Figure 3:
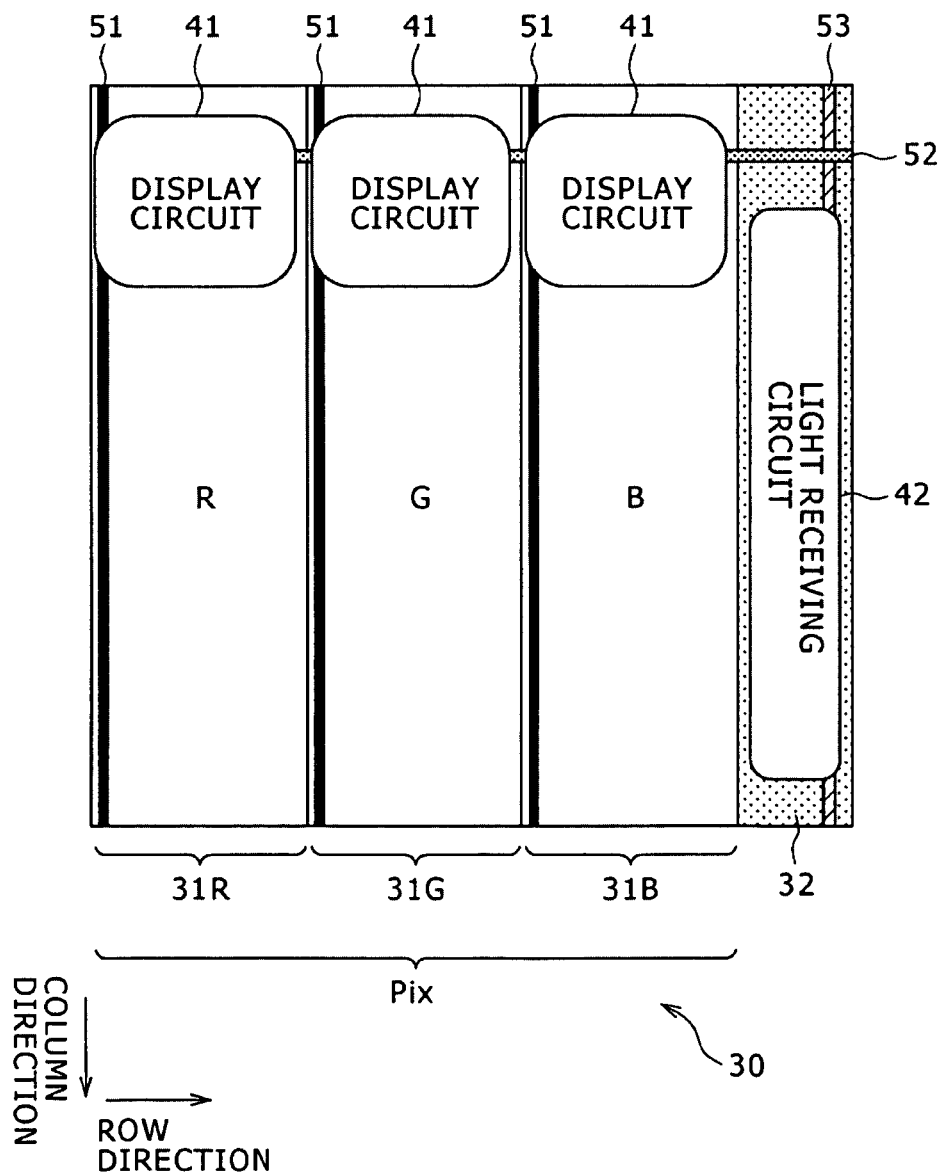
FIG. 3 illustrates an exemplary structure of a basic unit composed of a pixel and a light receiving circuit.

FIG. 3 shows an exemplary structure of a basic unit composed of the pixel and the light receiving circuit.

A basic unit 30 has a pixel Pix and a light receiving cell 32 arranged side by side in the row direction. The pixel Pix is composed of a display cell 31R for R illumination, a display cell 31G for G illumination, and a display cell 31B for B illumination. Each of the display cells 31R, 31G, and 31B contains a display circuit 41. The light receiving cell 32 contains a light receiving circuit 42. Hereinafter, the display cells 31R, 31G, and 31B will be simply referred to as a "display cell 31" unless they need to be distinguished from one another. Note that the display circuits 41 and the light receiving circuit 42 are formed on the same substrate (glass substrate).

In each display cell 31, the display circuit 41 is connected to the corresponding display signal line 51, and the display signal is supplied from the source driver 24 to the display circuit 41 via the display signal line 51. In addition, all the display circuits 41 in each display cell 31 are connected to the same display selection line 52, which extends in the row direction. A display selection signal outputted from the gate driver 23 is supplied to the display circuit 41 in each display cell 31 via the display selection line 52. The display circuit 41 controls the light emitted from the backlight in accordance with the display selection signal and the display signal.

Meanwhile, the light receiving circuit 42 controls light reception by a photosensor SSR (see FIG. 4), and supplies the light receiving signal generated by the photosensor SSR based on the light reception to the light receiving signal processing block 26 via a light receiving signal line 53, which extends in the column direction within the light receiving cell 32.

Figure 4:
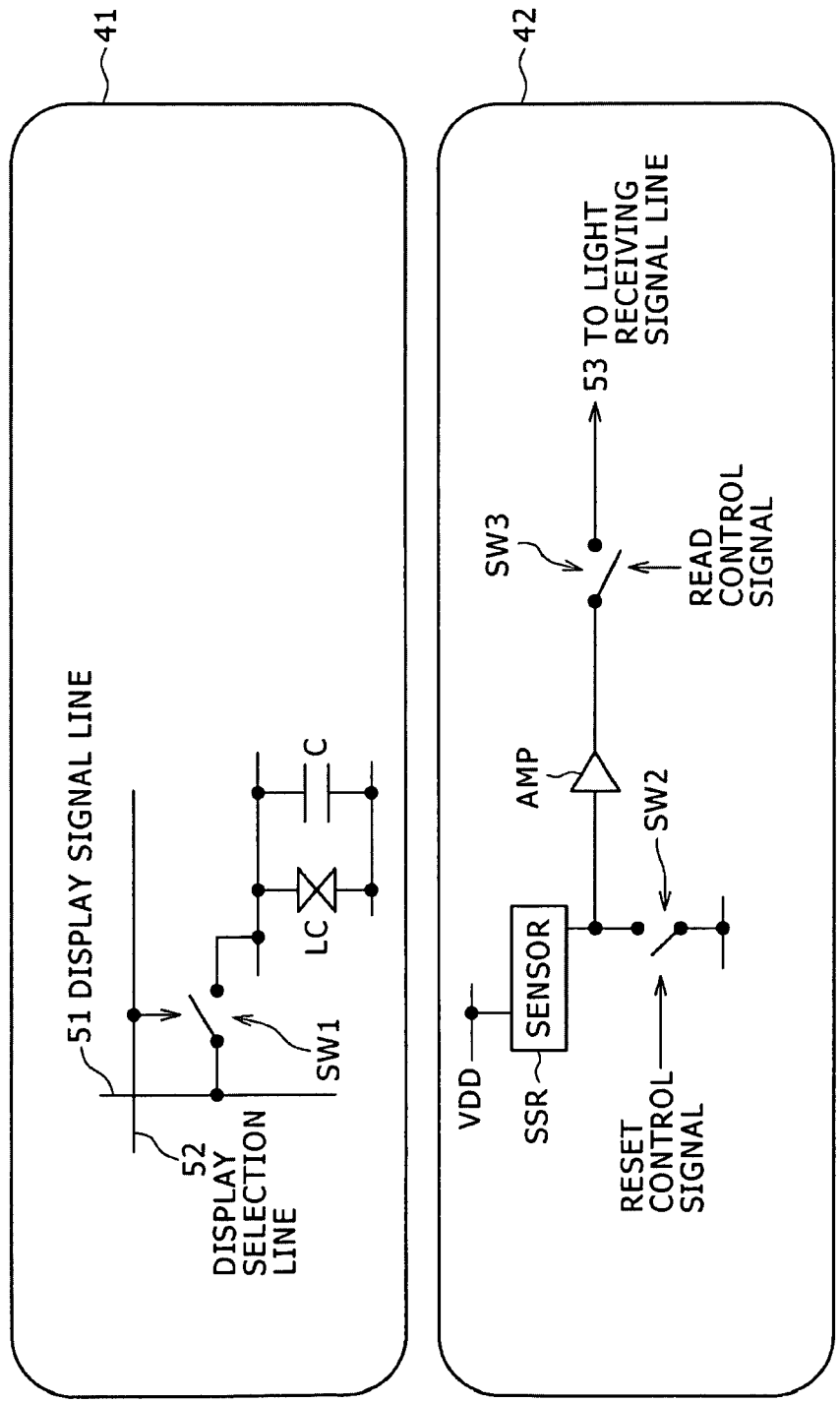
FIG. 4 illustrates exemplary circuitries of a display circuit and the light receiving circuit.

FIG. 4 shows exemplary circuitries of the display circuit 41 and the light receiving circuit 42.

The display circuit 41 includes a switching element SW1, a liquid crystal layer LC, and a storage capacitor C. The switching element SW1 is formed by a thin film transistor (TFT), for example.

In the display circuit 41, the switching element SW1 is turned on or off in accordance with the display selection signal supplied from the gate driver 23 via the display selection line 52. When the switching element SW1 is in an on position, the display signal is supplied from the source driver 24 to the liquid crystal layer LC and the storage capacitor C via the display signal line 51, so that a specific voltage is applied to the liquid crystal layer LC and the storage capacitor C. In the liquid crystal layer LC, an arrangement of liquid crystal molecules varies in accordance with the applied voltage, so that the light from the backlight is emitted toward the upper side of the display panel 25. While the switching element SW1 is in an off position, the voltage applied to the liquid crystal layer LC and the storage capacitor C is held therein. With a row of display cells 31 arranged in the row direction as one horizontal line, the on and off of the switching elements SW1 is switched one horizontal line after another in the column direction, i.e., line sequential scanning is performed, so that the display panel 25 as a whole displays an image.

The light receiving circuit 42 includes switching elements SW2 and SW3, a sensor SSR, and an amplifier AMP. Each of the switching elements SW2 and SW3 is formed by a TFT, for example. The sensor SSR is formed by a photodiode, a TFT, or the like, for example.

The sensor SSR receives light that enters through the surface of the display panel 25, and outputs a current signal corresponding to the intensity of the light received to the amplifier AMP. The amplifier AMP converts the current signal inputted from the sensor SSR into a voltage signal while amplifying it, and outputs the voltage signal as the light receiving signal. The switching element SW3 is turned on or off in accordance with a read control signal. When the switching element SW3 is in the on position, the light receiving signal outputted is supplied to the light receiving signal processing block 26 via the light receiving signal line 53. The switching element SW2 is turned on or off in accordance with a reset control signal. When the switching element SW2 is in the on position, the light receiving signal is reset.

The display circuit 41 and the light receiving circuit 42 having the above-described structures are placed within the display cell 31 and the light receiving cell 32, respectively, as shown in FIG. 3.

Note that the display panel 25 is not limited to the LCD, and that an electroluminescent (EL) display, which uses organic or inorganic EL elements as self-luminous elements, may be used to form the display panel 25.

Figure 5:
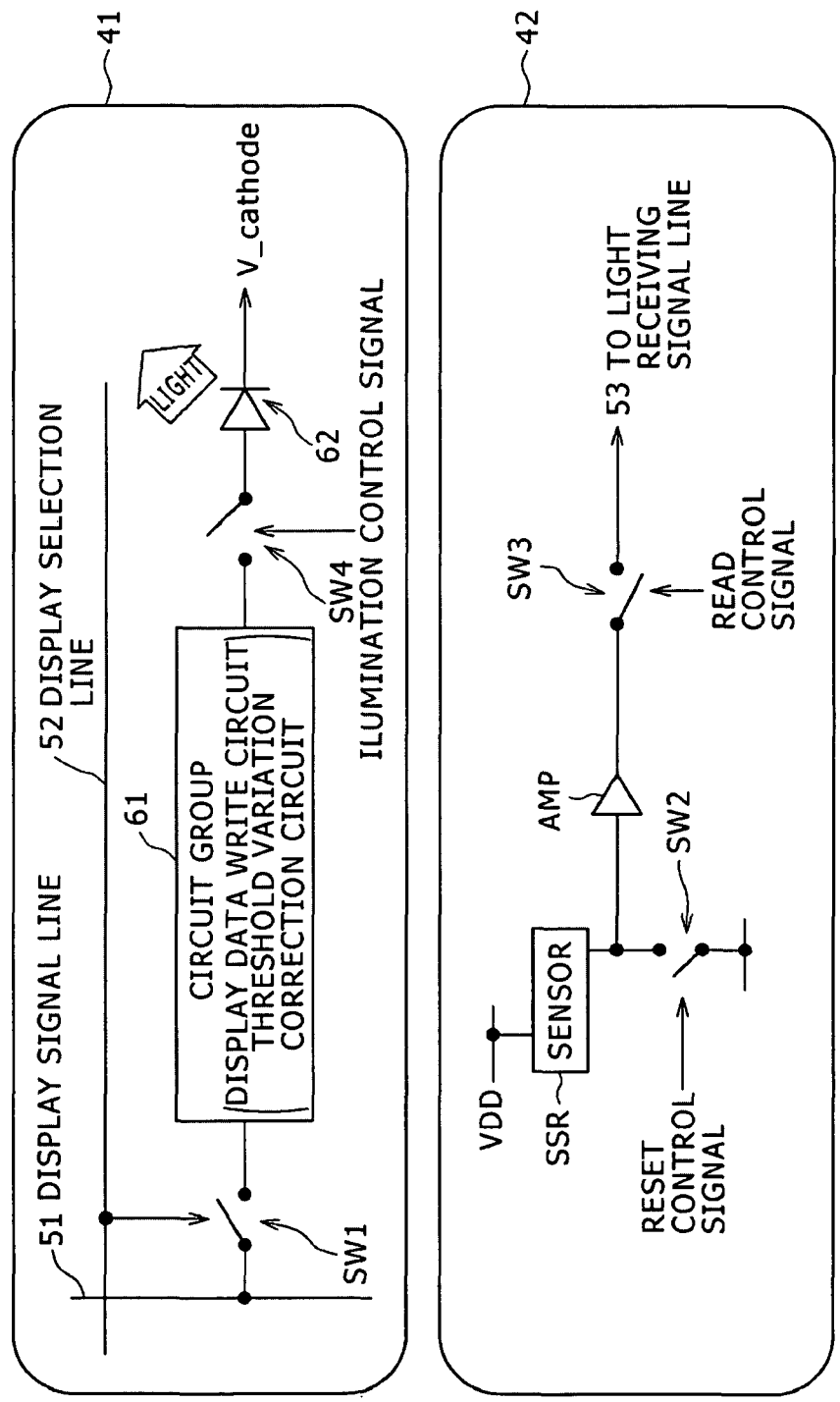
FIG. 5 illustrates exemplary circuitries of the display circuit and the light receiving circuit in the case where a display panel is formed by an EL display.

FIG. 5 shows exemplary circuitries of the display circuit 41 and the light receiving circuit 42 in the case where the display panel 25 is formed by the EL display. The circuitry of the light receiving circuit 42 is the same as in the case of FIG. 4, and therefore, a description thereof is omitted.

The display circuit 41 of FIG. 5 includes the switching element SW1, a switching element SW4, a circuit group 61, and an EL element 62.

The circuit group 61 is composed of a display data write circuit, a threshold variation correction circuit, and so on, for example. The display data write circuit is an I/V (current-voltage) conversion circuit that converts the display signal (i.e., the voltage signal) supplied from the switching element SW1 into a current signal. The threshold variation correction circuit is a circuit (a threshold correction circuit for the TFT) for correcting variations in the display signal caused by the switching element SW1.

The switching element SW1 is turned on or off in accordance with the display selection signal supplied from the gate driver 23 via the display selection line 52. When the switching element SW1 is in the on position, the display signal is supplied from the source driver 24 to the circuit group 61 via the display signal line 51. The circuit group 61 subjects the inputted display signal to the aforementioned I/V conversion, variation correction, and so on, and outputs the resulting display signal to the switching element SW4. The switching element SW4 is turned on or off in accordance with an illumination control signal. When the switching element SW4 is in the on position, the display signal is supplied from the circuit group 61 to the EL element 62. As a result, the EL element 62 is illuminated.

Note that each of the read control signal, the reset control signal, and the illumination control signal, which have described with reference to FIGS. 4 and 5, is supplied from the gate driver 23 or the source driver 24 via a control line (not shown).

Figure 6:
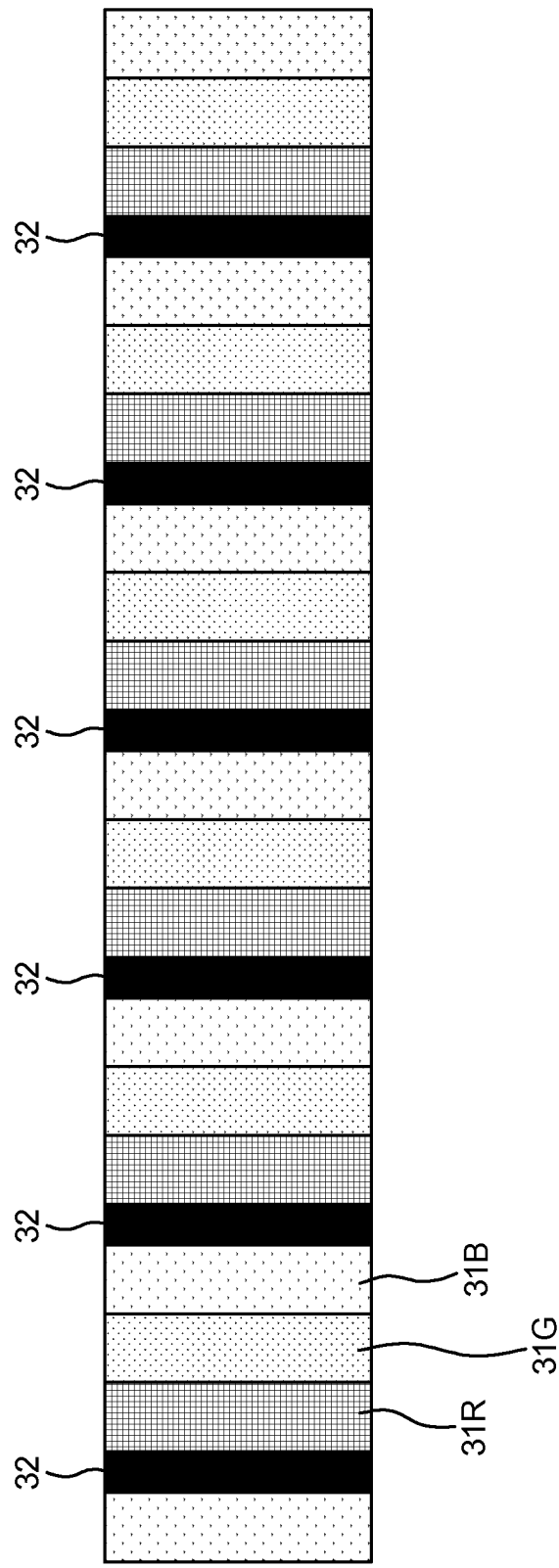
FIG. 6 illustrates an arrangement of the basic units of FIG. 3 repeatedly arranged in a row direction.

FIG. 6 illustrates a display state of one row composed of a number of basic units 30 of FIG. 3 arranged repeatedly in the row direction.

Figure 7:
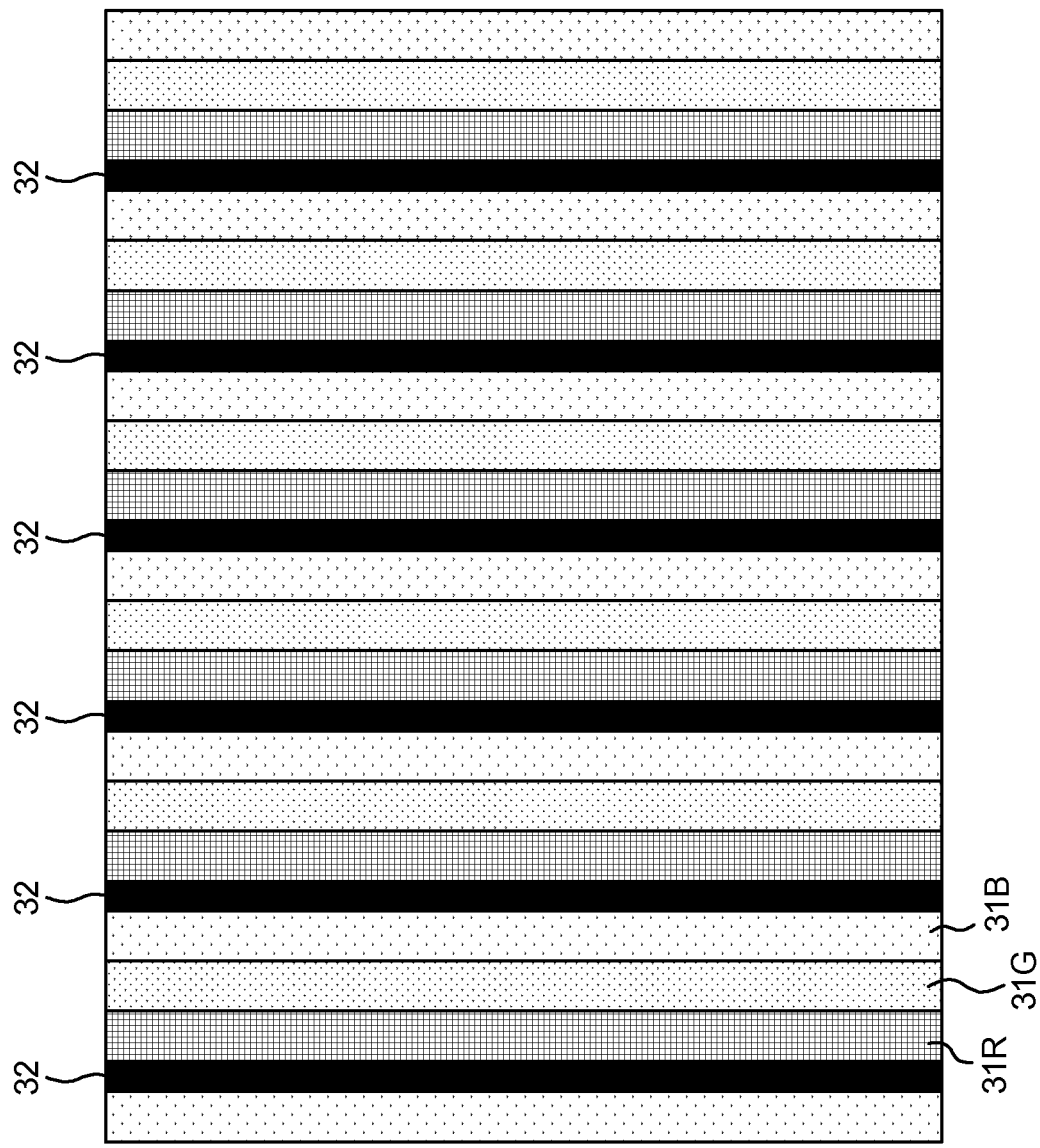
FIG. 7 illustrates an arrangement of a two-dimensional array of the basic units of FIG. 3.

FIG. 7 illustrates a display state of a two-dimensional array of the basic units 30 of FIG. 3, which is obtained by extending the one row as shown in FIG. 6 in the column direction.

In the case where the light receiving resolution and the display resolution are identical, the display panel is composed of an array of basic units 30 of FIG. 3, i.e., the basic units 30 arranged in rows and columns.

When the display circuit 41 controls the liquid crystal layer LC to allow the light from the backlight to pass therethrough, the display cells 31R, 31G, and 31B display the colors of red, green, and blue, respectively. Meanwhile, the light receiving cell 32 is an area that does not allow the light from the backlight to pass therethrough. Therefore, the user perceives the light receiving cell 32 as the color of black.

In FIGS. 6 and 7, color differences between R, G, and B are shown by different degrees of shading. Specifically, the color of red, which corresponds to the display cells 31R, is indicated by a high degree of shading, the color of green, which corresponds to the display cells 31G, is indicated by a moderate degree of shading, and the color of blue, which corresponds to the display cells 31B, is indicated by a low degree of shading. The same applies to other figures described below.

Figure 8:
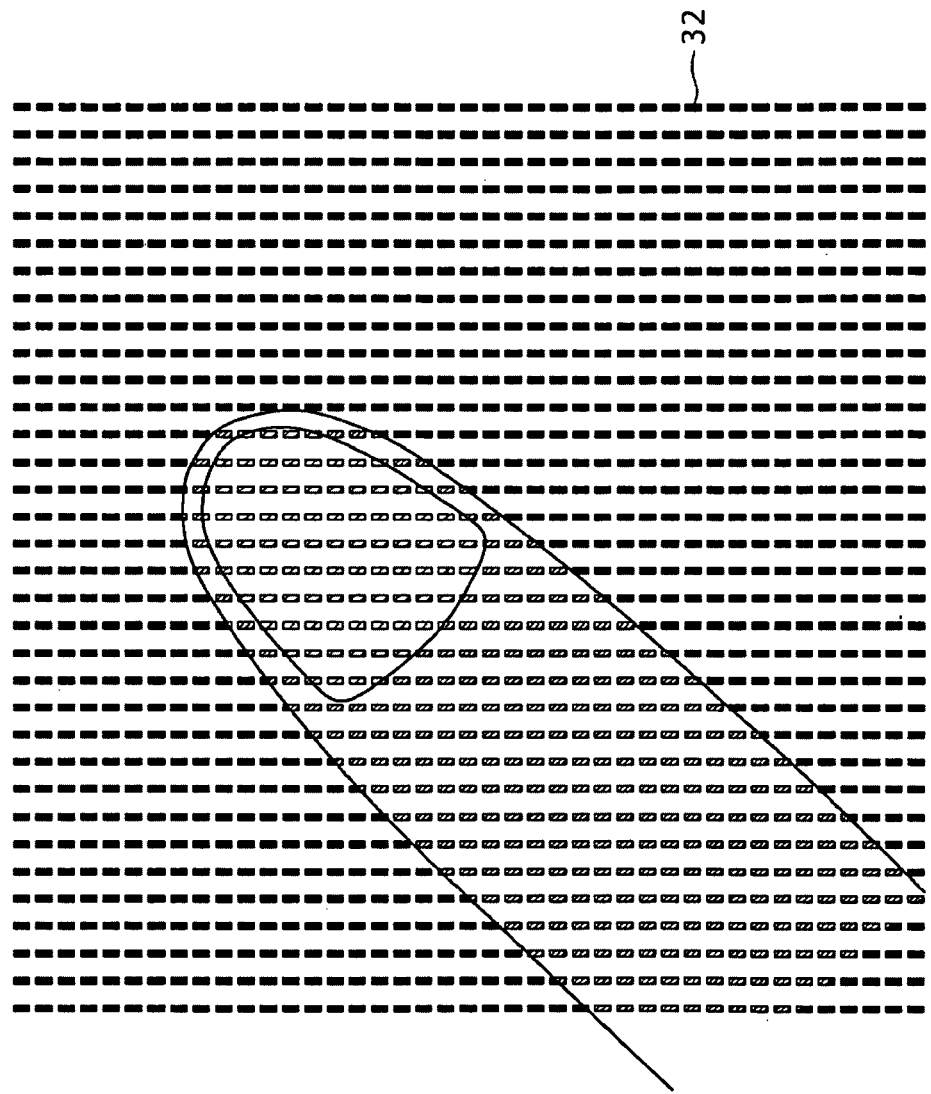
FIG. 8 is a conceptual illustration of a situation in which a finger of a user's is in contact with or located close to a screen.

FIG. 8 is a conceptual illustration of a situation in which a finger of the user's as a detection target object is in contact with or located close to the screen of the display panel with the arrangement as shown in FIG. 7, where the light receiving resolution and the display resolution are identical.

In FIG. 8, an array of only the light receiving cells 32 is shown in order to place focus on light receiving sensitivity of the light receiving cells 32.

Figure 9:
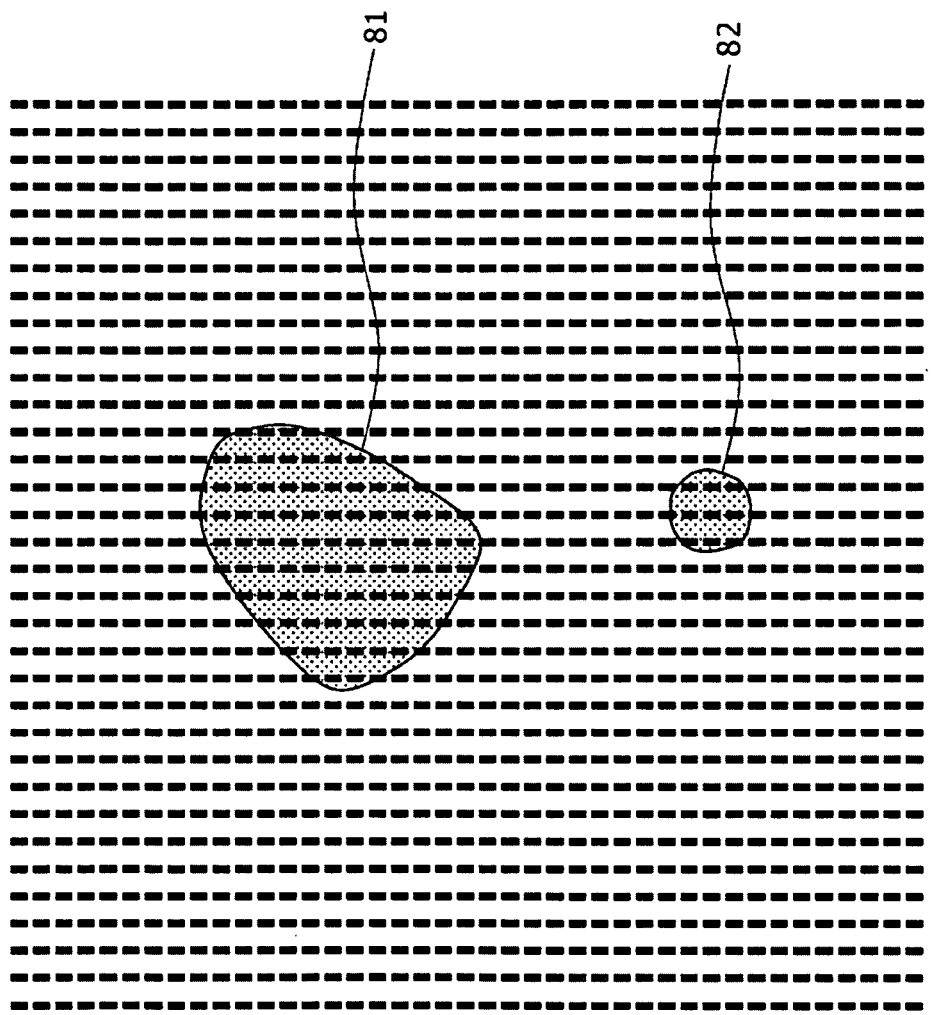
FIG. 9 illustrates contact areas in cases of the finger and a pen.

When the finger of the user's is in contact with or located close to the screen, some of the light receiving cells 32 in the array receive the light reflected from the finger as the detection target object. In FIG. 9, an area within which the finger is in contact with or located so close to the screen as to allow the light receiving cells 32 therein to receive the reflected light is shown as a contact area 81. Thus, the light receiving cells 32 within the contact area 81 receive the light reflected from the finger as the detection target object.

Meanwhile, a contact area 82 in FIG. 9 represents an area within which the light receiving cells 32 are capable of receiving the light reflected from the pen when the user places the pen, which is an object having a fine tip, in contact with or close to the screen, for example. It is apparent from FIG. 9 that smaller detection target objects result in smaller contact areas and smaller numbers of light receiving cells 32 (i.e., photosensors SSR therein) within the contact area.

Here, as noted previously, in the display panel 25 of the information processing apparatus 1 as shown in FIG. 1, one light receiving circuit 42 (i.e., one light receiving cell 32) is provided for a plurality of pixels Pix, i.e., the light receiving resolution is lower than the display resolution. In other words, the light receiving cells 32 are thinned in arranging them on the display panel 25.

In the present embodiment, no limitation is placed on a reason for the thinning of the light receiving cells 32 in the display panel 25, and various reasons are conceivable therefor. For example, the light receiving cells 32 may be thinned in order to arrange reference sensors with the view of improving an SN ratio by canceling noise caused by reflected light within the display panel 25. A pixel (hereinafter referred to as a "reference cell") in which the reference sensor is placed has the light receiving circuit 42 as contained in the light receiving cell 32. However, the reference cell has a black mask formed toward the uppermost part (i.e., the surface) of the screen, so that the light receiving circuit 42 does not receive the light reflected from the detection target object but receives only the reflected light within the display panel 25. As such, it is possible to cancel the noise caused by the reflected light within the display panel 25 and improve the SN ratio by subtracting, from the light receiving signals obtained by the light receiving cells 32, appropriate amounts of the light receiving signals obtained by the reference sensors.

Also, the light receiving cells 32 may be thinned in the case where, simply, there is no need for a high light receiving resolution, for example. Also, the light receiving cells 32 may be thinned in order to improve the transmittance of light when the backlight is adopted, or in order to reduce a load of signal processing or image processing in a subsequent stage.

In the case where the light receiving cells 32 are thinned in arranging them on the display panel 25, pixels called "dummy blacks" are sometimes placed at locations where the light receiving cells 32 are omitted. A brief description of a reason for placing the dummy blacks thereat is provided below.

Each of the light receiving cells 32 is a pixel that does not emit light. Accordingly, as is apparent from FIG. 9, the image displayed includes black stripes that correspond to locations of the light receiving cells 32. In the case where the display resolution and the light receiving resolution are identical as in FIG. 9, a pitch of the black stripes that correspond to the locations of the light receiving cells 32 is short. In contrast, in the case where the light receiving cells 32 are selectively eliminated evenly at a specific rate, e.g., a rate of one light receiving cell 32 to several pixels Pix, for example, the pitch of the black stripes that correspond to the locations of the light receiving cells 32 is long.

As one sensitivity characteristic, people tend to visually perceive even a slight change in brightness more easily as a spatial frequency decreases. Roughly speaking, the spatial frequency means a shade variation (contrast) of white (light portions) and black (dark portions). In the present embodiment, the spatial frequency corresponds to shade variations resulting from white portions corresponding to the display cells 31 and black portions corresponding to the light receiving cells 32 when the image is displayed on the display panel 25. If the spatial frequency is low, that means that a pitch of the black portions is long. Thus, if the light receiving cells 32 are selectively eliminated at the specific rate simply, resulting in an increased pitch of the black portions of the stripes, people would visually perceive the portions of the light receiving cells 32 as the black stripes, unfavorably.

Accordingly, the dummy blacks, which are dummy black pixels, are placed at the locations where the light receiving cells 32 are omitted so as to prevent the spatial frequency from decreasing so greatly that people will perceive the portions of the light receiving cells 32 as the black stripes. Each of the dummy blacks does not have the light receiving circuit 42, but only has the black mask formed toward the uppermost part (i.e., the surface) of the screen.

Returning to FIG. 9, the thinning of the light receiving cells 32 in arranging them on the display panel 25 will not result in a significantly increased difficulty in calculating the location of the detection target object with a large contact area like the contact area 81, but may result in an inability to calculate the accurate location of the detection target object with a small contact area like the contact area 82, because the number of photosensors SSR within the contact area 82 becomes even smaller than when the light receiving cells 32 are not thinned.

Figure 10:
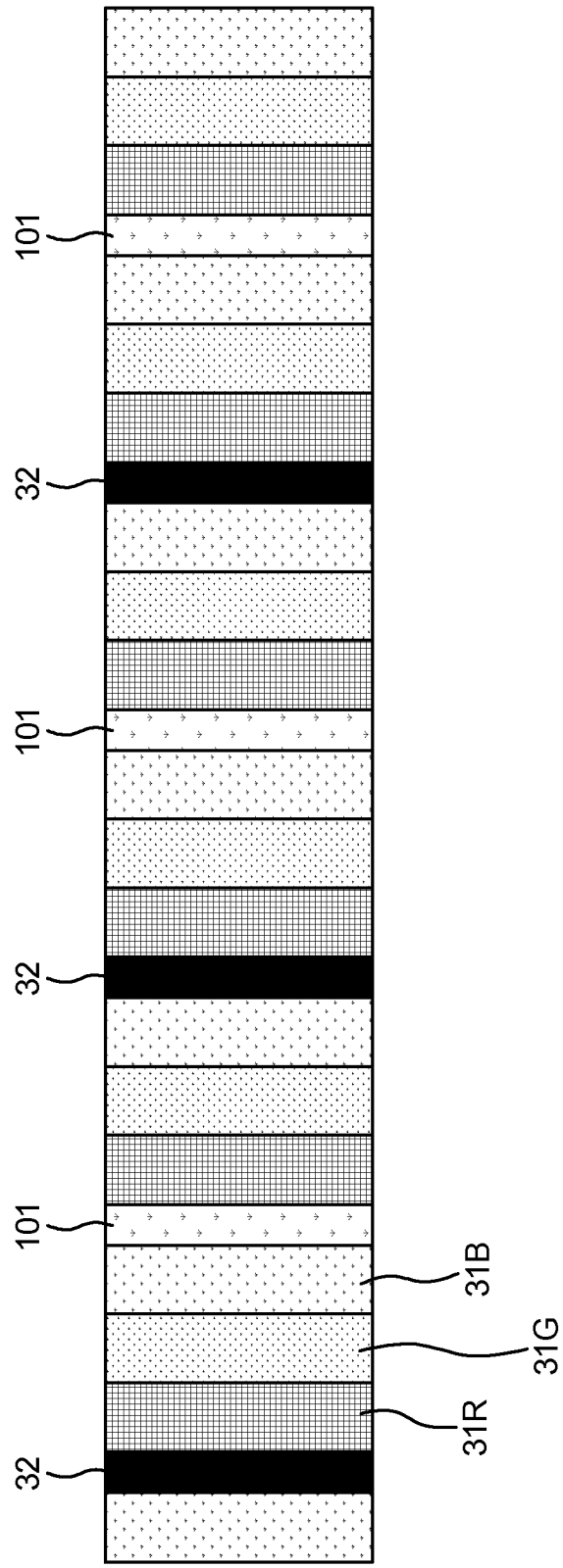
FIGS. 10, 11, and 12 are illustrations for explaining a problem that might occur when light receiving cells are thinned.
Figure 11:
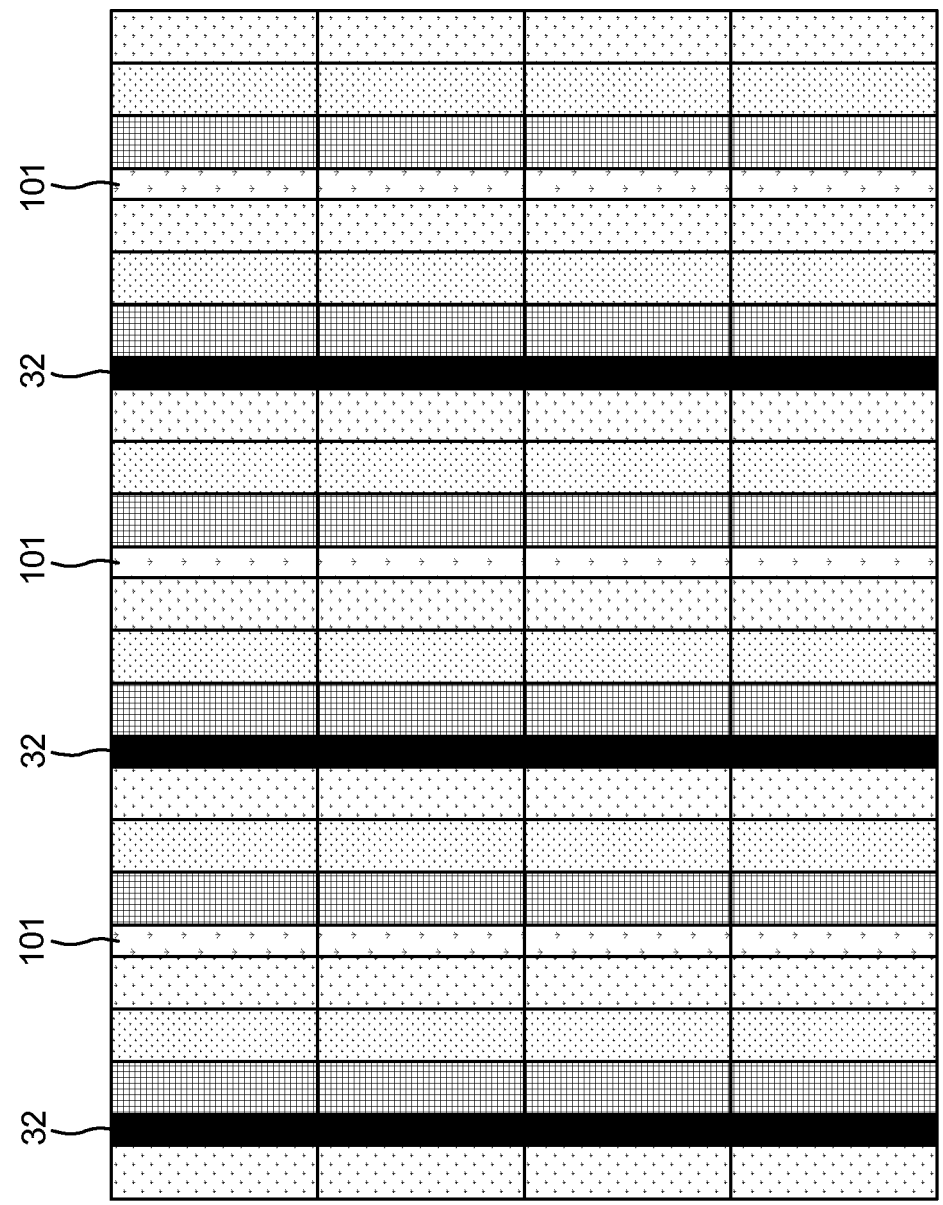
Figure 12:
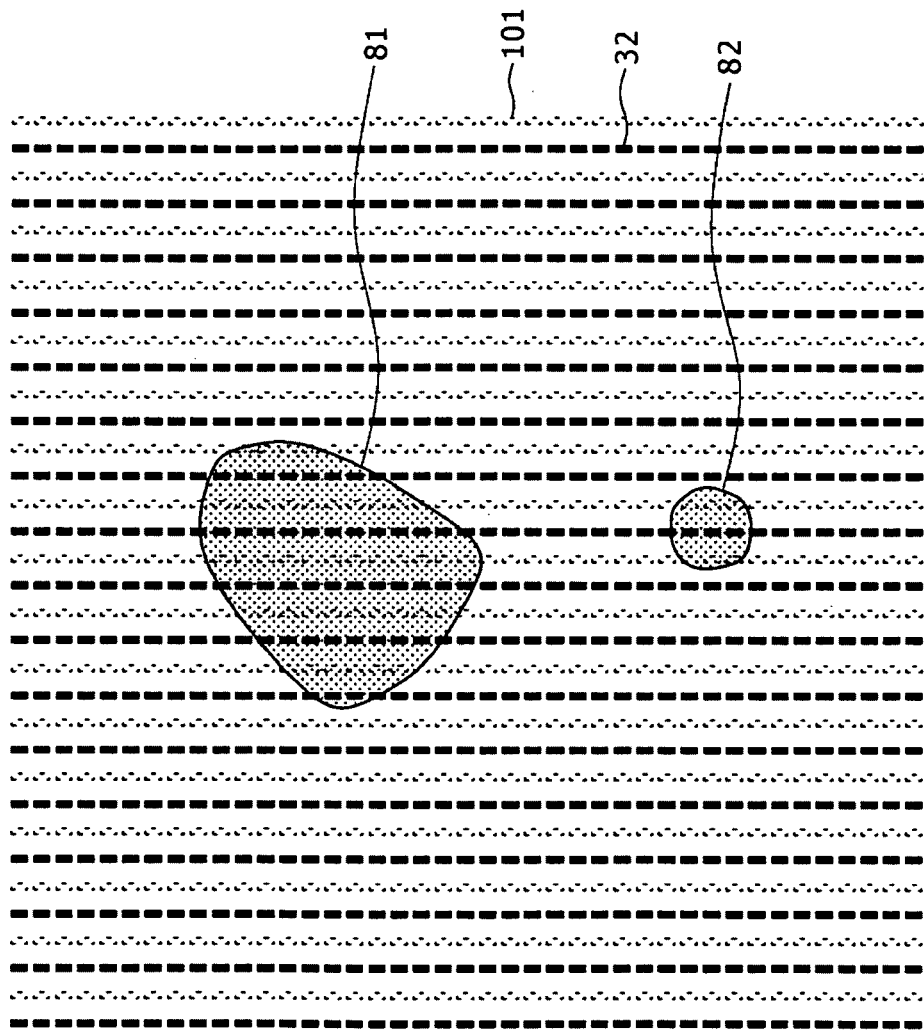

Further descriptions are provided with reference to FIGS. 10, 11, and 12.

FIG. 10 illustrates an exemplary arrangement of one row in which one light receiving cell 32 is provided for every two pixels Pix. FIG. 11 illustrates an exemplary arrangement of an array obtained by extending the row as illustrated in FIG. 10 in the column direction.

In other words, with the exemplary arrangements as shown in FIGS. 10 and 11, the light receiving resolution is half the display resolution (hereinafter, this will be referred to also as "½ thinning" as appropriate). Note that, in FIGS. 10 and 11, the reference cells 101 as described above are placed at locations where the light receiving cells 32 are omitted.

FIG. 12 illustrates the display panel with the arrangement of FIG. 11 upon which the contact areas 81 and 82 are superimposed, similarly to FIG. 9. The contact area 81 is the area within which the finger is in contact with or located close to the screen. The contact area 82 is the area within which the pen is in contact with or located close to the screen.

Even in the case of the ½ thinning, a large number of light receiving cells 32 exist within the contact area 81, and therefore it will be possible to detect the location of the finger accurately without a problem. In other words, in signal processing or image processing for calculating the location of the center of gravity of the object, an error in the result of the calculation will not be significant in comparison to an error in the result of the calculation in the case of the arrangement of FIG. 9 where the light receiving cells 32 are not thinned.

On the other hand, the number of light receiving cells 32 that exist within the contact area 82 is extremely small. Therefore, when the signal processing or image processing for calculating the location of the center of gravity of the object is performed based on the light receiving signals supplied from the light receiving cells 32 within the contact area 82, it is likely that an error in the result of the calculation will be significant in comparison to an error in the result of the calculation in the case of the arrangement of FIG. 9 where the light receiving cells 32 are not thinned. This is a problem.

Therefore, the display panel 25 of the information processing apparatus 1 as shown in FIG. 1 adopts a structural arrangement that prevents the above problem from occurring even in the case where the light receiving resolution is set lower than the display resolution.

Figure 13:
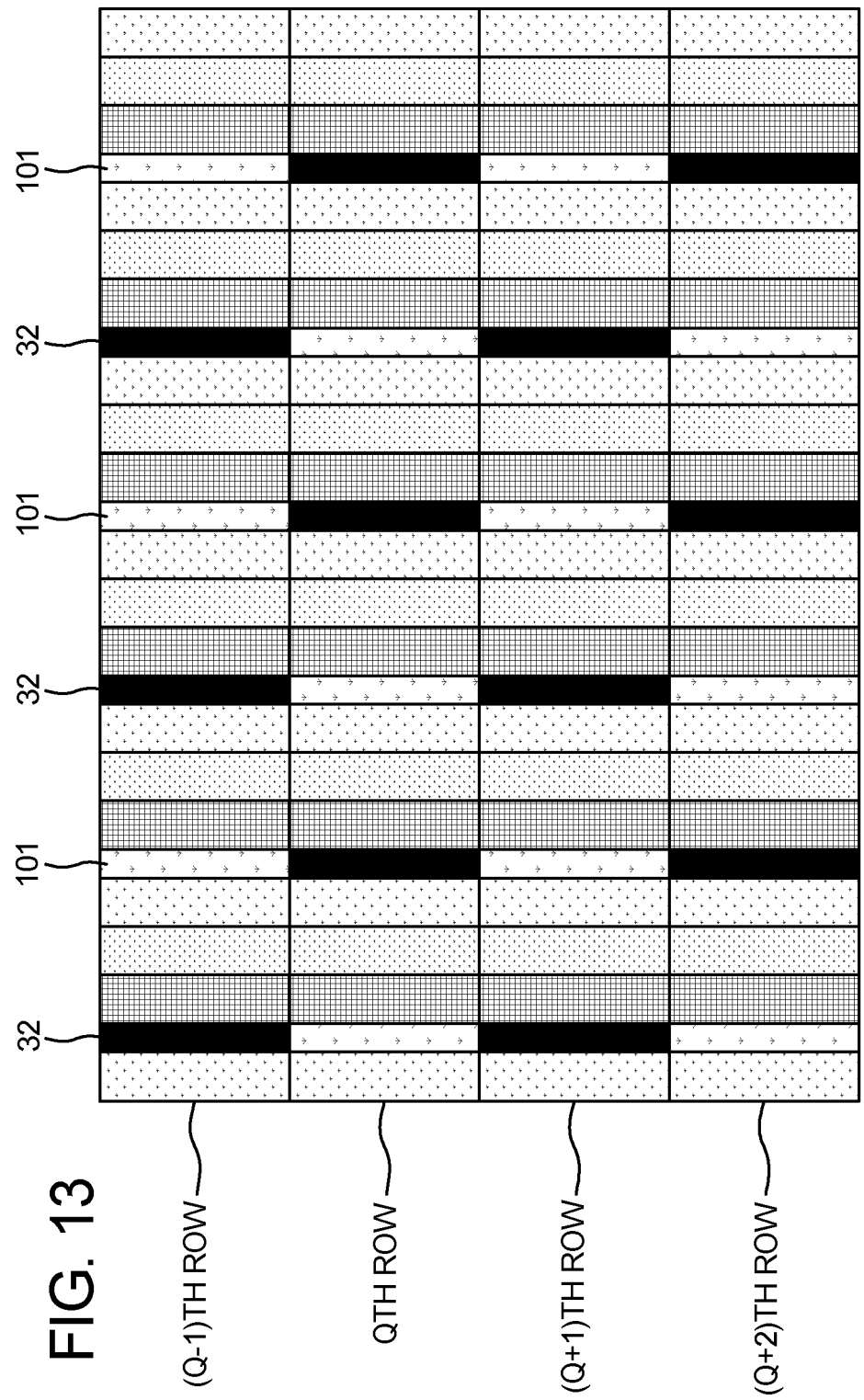
FIG. 13 illustrates a first embodiment of the display panel of the information processing apparatus as shown in FIG. 1.

FIG. 13 illustrates a structural arrangement according to a first embodiment as adopted by the display panel 25 of the information processing apparatus 1 as shown in FIG. 1.

The arrangement of FIG. 13 is identical to the exemplary arrangement of FIG. 11 when focus is placed on each individual row. That is, in each individual row, the light receiving cell 32 and the reference cell 101 alternate in arrangement. However, the arrangement of FIG. 13 is different from the exemplary arrangement of FIG. 11 in that locations of the light receiving cells 32 and the reference cells 101 are reversed between every two adjacent rows.

Specifically, the locations of the light receiving cells 32 and the reference cells 101 are reversed between a (Q−1)th row and a Qth row. Also, the locations of the light receiving cells 32 and the reference cells 101 are reversed between the Qth row and a (Q+1)th row. In other words, in the Qth row, the reference cells 101 are placed in the columns where the light receiving cells 32 are placed in the (Q−1)th row. Further, in the (Q+1)th row, the reference cells 101 are placed in the columns where the light receiving cells 32 are placed in the Qth row. In other words, each of the light receiving cells 32 in the Qth row is placed at a midpoint location between two neighboring light receiving cells 32 in the (Q−1)th row, and each of the light receiving cells 32 in the (Q+1)th row is placed at a midpoint location between two neighboring light receiving cells 32 in the Qth row. Here, Q=3, 4, . . . , n−3 (n≥6). Therefore, in the arrangement of FIG. 13 also, the light receiving resolution is half the display resolution, as in the arrangement of FIG. 11.

Figure 14:
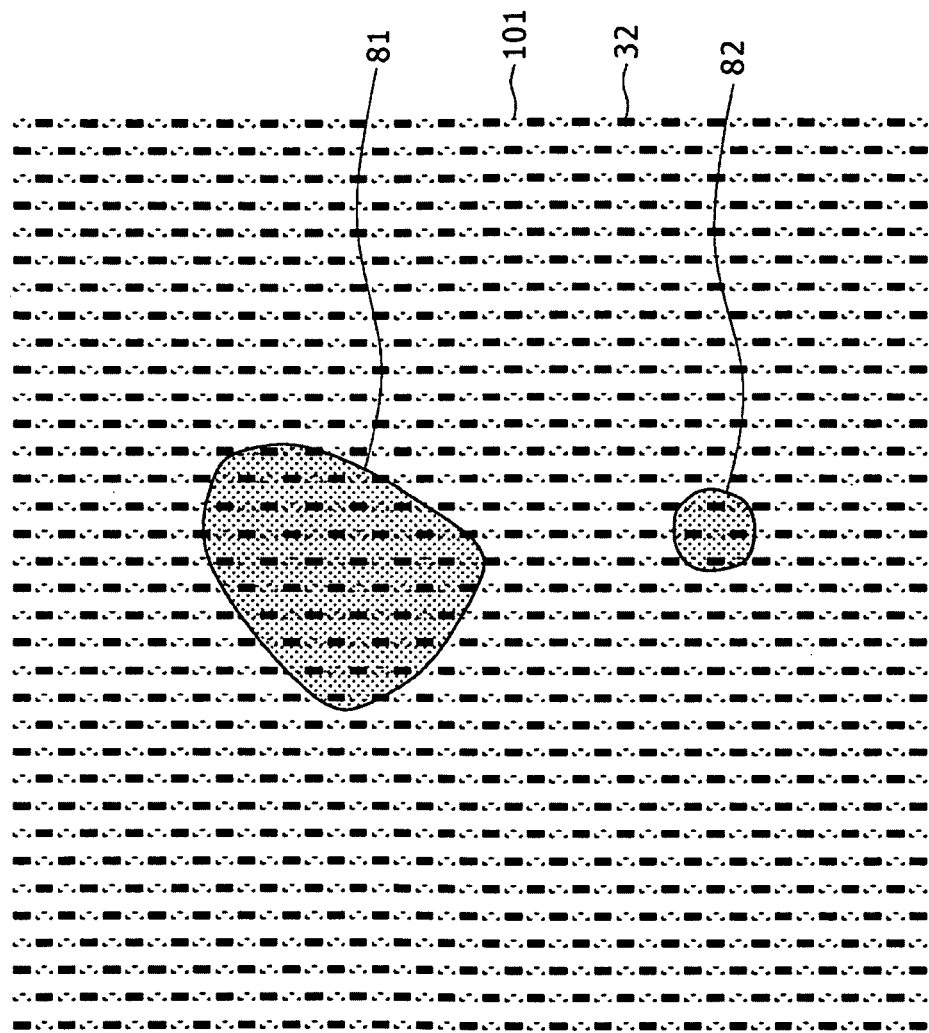
FIG. 14 is an illustration for explaining an effect of an arrangement of the first embodiment.

FIG. 14 illustrates the display panel 25 with the arrangement of FIG. 13 upon which the contact areas 81 and 82 are superimposed, similarly to FIGS. 9 and 12. The contact area 81 is the area within which the finger is in contact with or located close to the screen. The contact area 82 is the area within which the pen is in contact with or located close to the screen.

A range that can be detected by the light receiving cells 32 contained in the contact area 82 and which surrounds all the light receiving cells 32 contained in the contact area 82 is larger in the case of the arrangement of FIG. 14 than in the case of the arrangement of FIG. 12, which is also subjected to the ½ thinning. That is, it can be said that an improvement in the light receiving resolution is achieved in effect by reversing the locations of the light receiving cells 32 and the reference cells 101 between every two adjacent rows.

Therefore, even in the case where the signal processing or the image processing for calculating the location of the center of gravity of the object is performed based on an output from the light receiving cells 32 included in the contact area 82 on the display panel 25 with the arrangement of FIG. 13, an error in the calculation of the location of the center of gravity of the object will be slight. In other words, even in the case where the signal processing or the image processing for calculating the location of the center of gravity of the object is performed based on the output from the light receiving cells 32 included in the small contact area 82, the result of the calculation obtained is reliable. Needless to say, in the case where the location of the object is calculated based on an output from the light receiving cells 32 included in the large contact area 81 also, the result of the calculation obtained is reliable.

Notice here that, in the basic unit 30 as shown in FIG. 3, the light receiving cell 32 is arranged on the side of the pixel Pix in the row direction. However, this is not essential to the present embodiment. For example, the light receiving cell 32 may be arranged below the pixel Pix in the column direction.

As such, next, a structure of a basic unit 30' in which the light receiving cell 32 is arranged below the pixel Pix in the column direction will now be described below.

Figure 15:
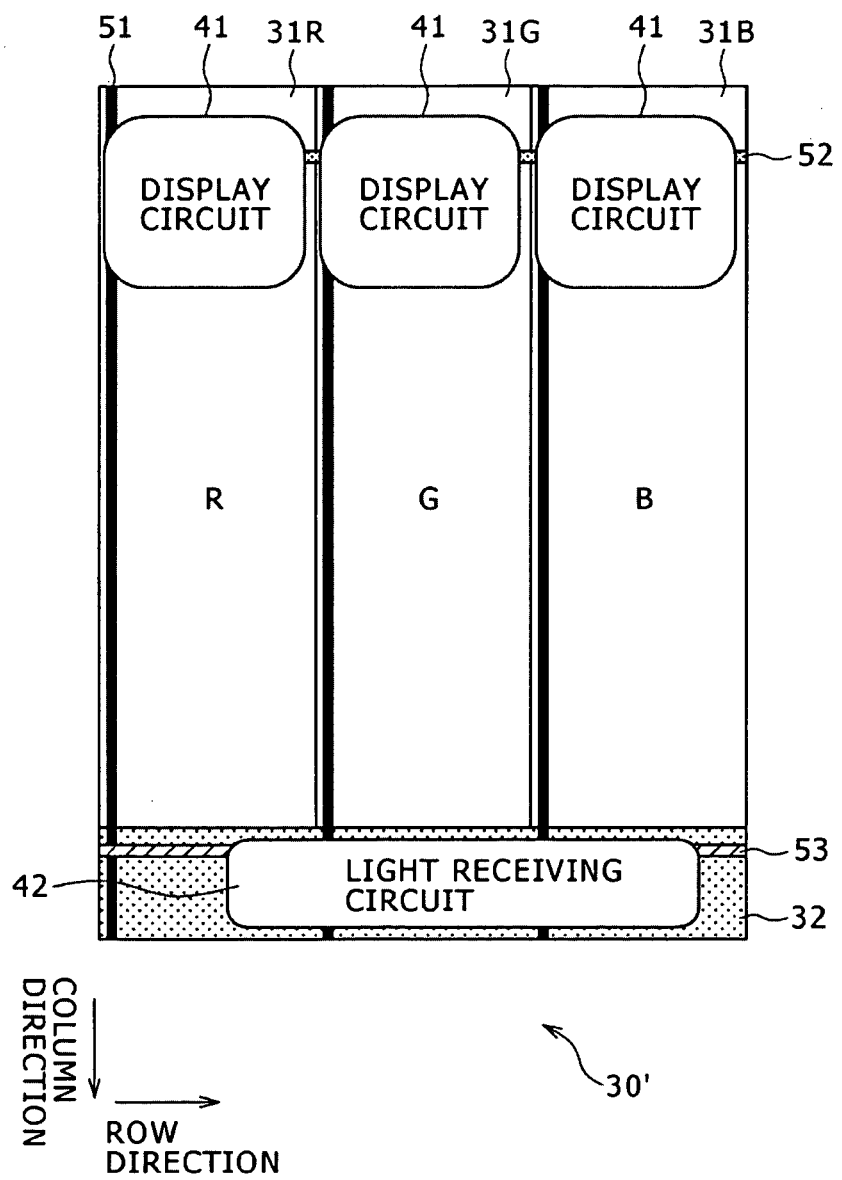
FIG. 15 illustrates another exemplary structure of the basic unit composed of the pixel and the light receiving circuit.

FIG. 15 shows the basic unit 30' in which the light receiving cell 32 is arranged below the pixel Pix in the column direction.

In the basic unit 30', the light receiving signal line 53 extends in the row direction because the light receiving cell 32 is arranged below the pixel Pix in the column direction.

Figure 16:
FIG. 16 illustrates an arrangement of the basic units of FIG. 15 repeatedly arranged in the row direction.

FIG. 16 illustrates a display state of one row composed of a number of basic units 30' of FIG. 15 arranged repeatedly in the row direction.

Figure 17:
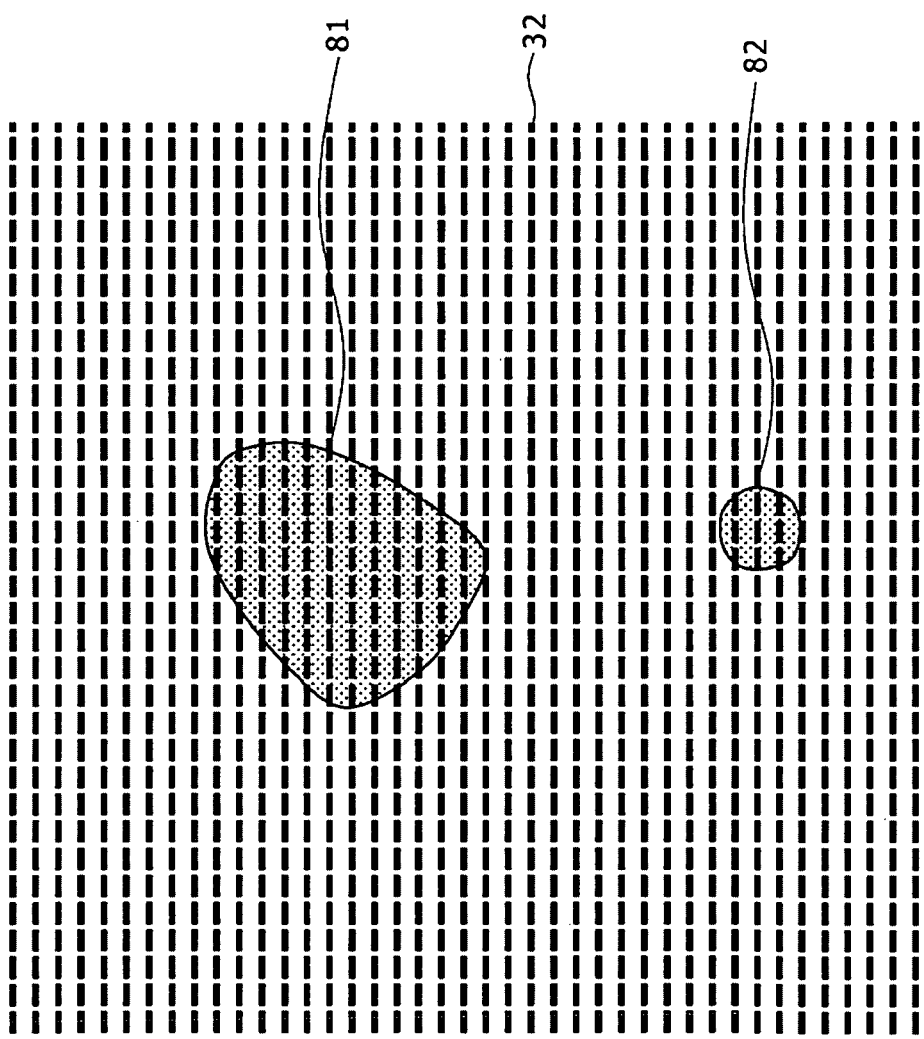
FIG. 17 illustrates an arrangement of a two-dimensional array of the basic units of FIG. 15.

FIG. 17 illustrates an exemplary structural arrangement of a two-dimensional array of the basic units 30' of FIG. 15, upon which the contact areas 81 and 82 are superimposed, similarly to FIGS. 9 and 12.

In the case where a number of basic units 30' are arranged in a two-dimensional array and the light receiving resolution and the display resolution are identical, a sufficient number of light receiving cells 32 naturally exist in both the contact areas 81 and 82. Therefore, the signal processing or the image processing for calculating the location of the center of gravity of the object can be performed based on the output from the light receiving cells 32 included in the contact area 81 or 82 without a problem.

Figure 18:
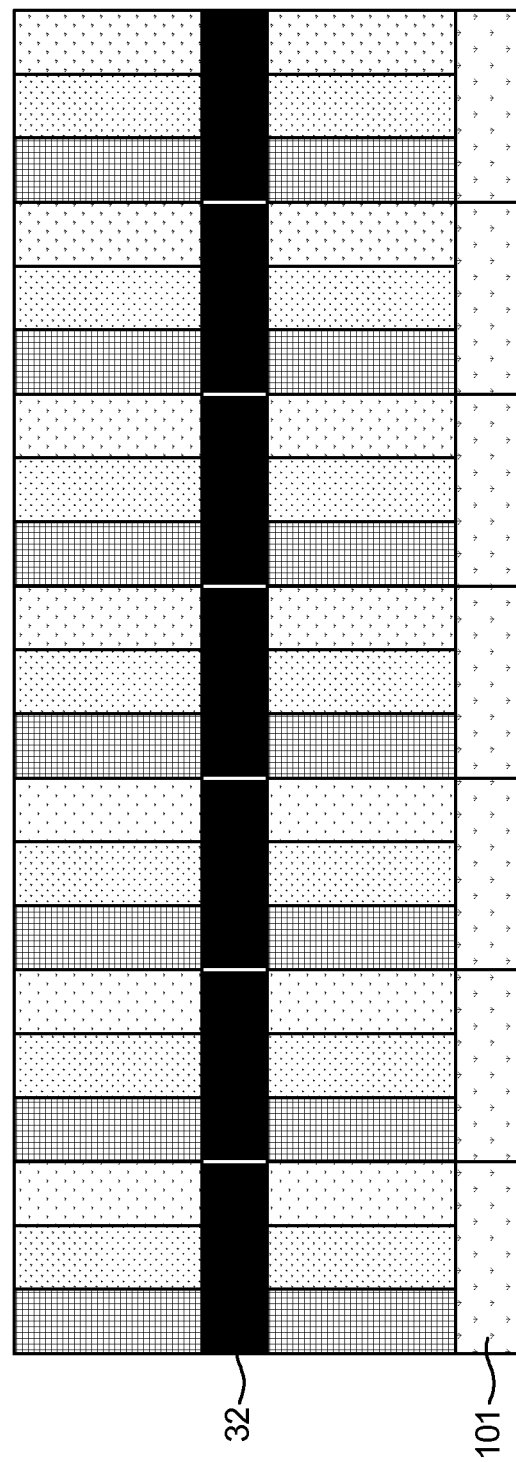
FIGS. 18 and 19 are illustrations for explaining a problem that might occur when the light receiving cells are thinned.

FIG. 18 illustrates an exemplary arrangement of two rows of basic units 30', where the light receiving cells 32 are thinned such that one light receiving cell 32 is provided for every two pixels Pix that are adjacent to each other in the column direction and where the reference cells 101 are placed at the locations where the light receiving cells 32 are omitted.

Figure 19:
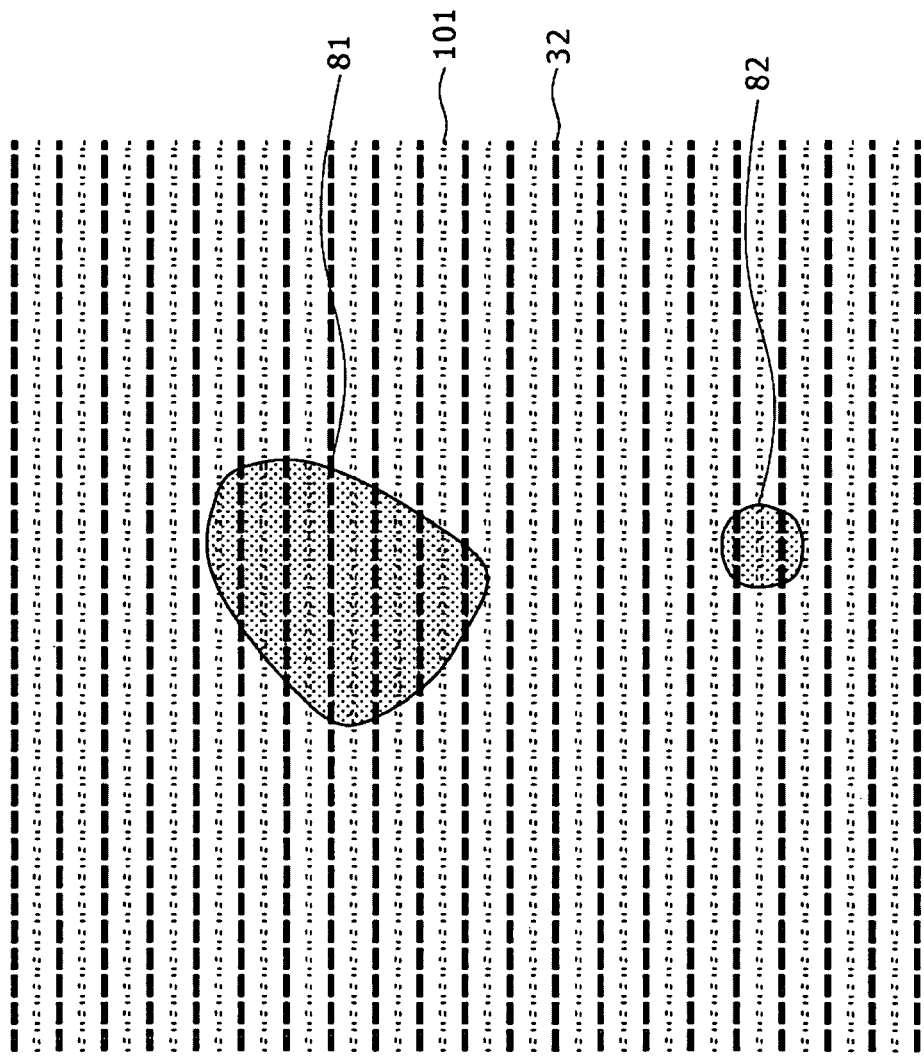

FIG. 19 illustrates a display panel on which the two rows of basic units 30' as shown in FIG. 18 are repeated in the column direction, upon which the contact areas 81 and 82 are superimposed, similarly to FIGS. 9 and 12.

In the case of the arrangement as shown in FIG. 19 also, the number of light receiving cells 32 included in the small contact area 82 is extremely small. Therefore, when the calculation of the location of the center of gravity of the object or the image processing is performed based on the output from the small number of light receiving cells 32 included in the contact area 82, it is likely that an error relative to the actual location of the object will be significant.

Figure 20:
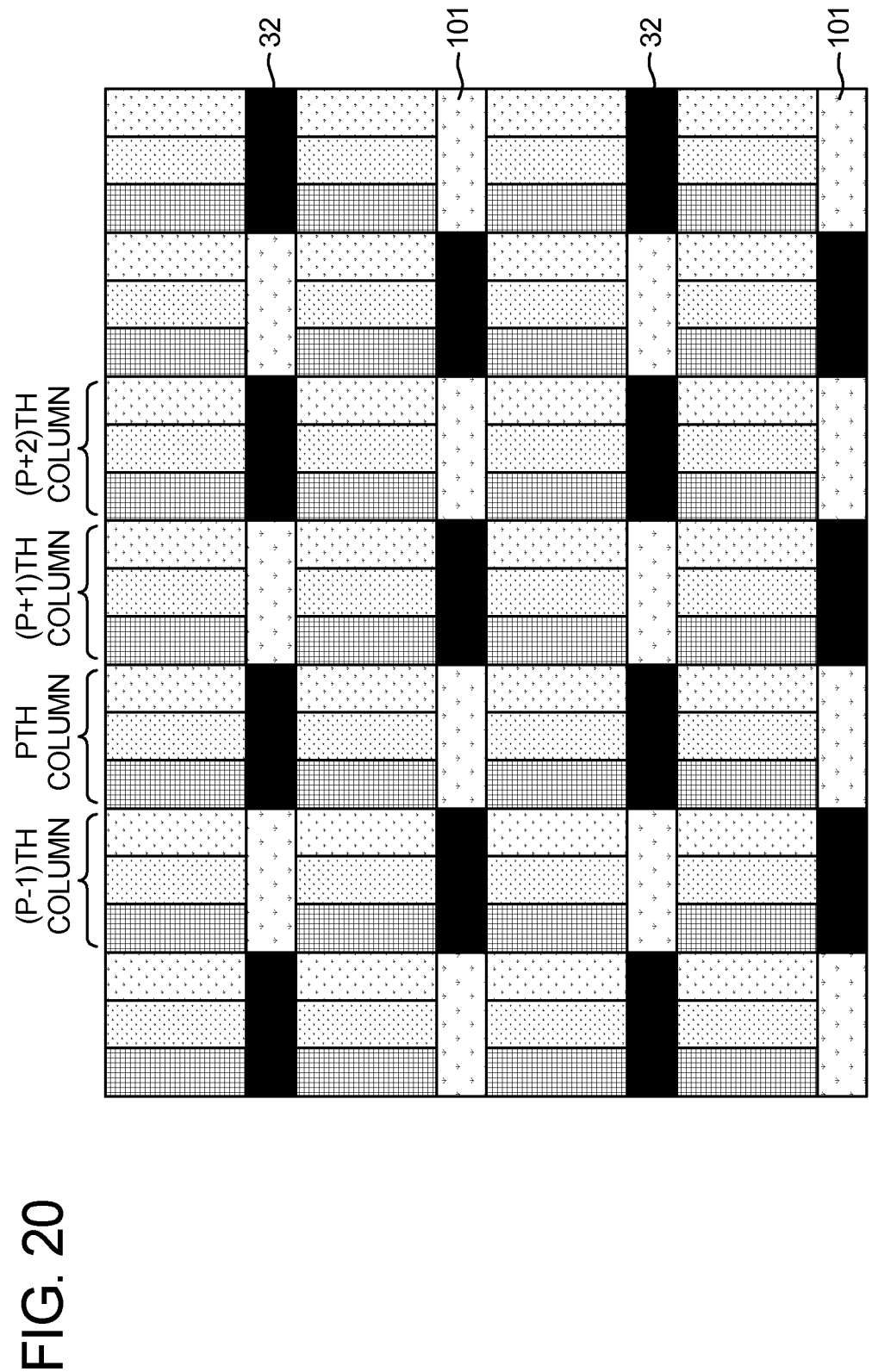
FIG. 20 illustrates a second embodiment of the display panel of the information processing apparatus as shown in FIG. 1.

As such, when the light receiving cells 32 are thinned in the case of the display panel on which the basic units 30' are arranged in a two-dimensional array, an arrangement as illustrated in FIG. 20 is adopted, for example. That is, FIG. 20 illustrates a second embodiment of the display panel 25 of the information processing apparatus 1 as shown in FIG. 1.

The arrangement of FIG. 20 is identical to the exemplary arrangement of FIG. 18 when focus is placed on each individual column. That is, in each individual column, the light receiving cell 32 and the reference cell 101 alternate in arrangement. However, the arrangement of FIG. 20 is different from the exemplary arrangement of FIG. 18 in that locations of the light receiving cells 32 and the reference cells 101 are reversed between every two adjacent columns.

Specifically, the locations of the light receiving cells 32 and the reference cells 101 are reversed between a (P−1)th column and a Pth column. Also, the locations of the light receiving cells 32 and the reference cells 101 are reversed between the Pth column and a (P+1)th column. In other words, in the Pth column, the reference cells 101 are placed in the rows where the light receiving cells 32 are placed in the (P−1)th column. Further, in the (P+1)th column, the reference cells 101 are placed in the rows where the light receiving cells 32 are placed in the Pth column. In other words, each of the light receiving cells 32 in the Pth column is placed at a midpoint location between two neighboring light receiving cells 32 in the (P−1)th column, and each of the light receiving cells 32 in the (P+1)th column is placed at a midpoint location between two neighboring light receiving cells 32 in the Pth column. Here, P=2, 3, . . . , m−2. Therefore, the exemplary arrangement of FIG. 20 is also that of the ½ thinning.

Figure 21:
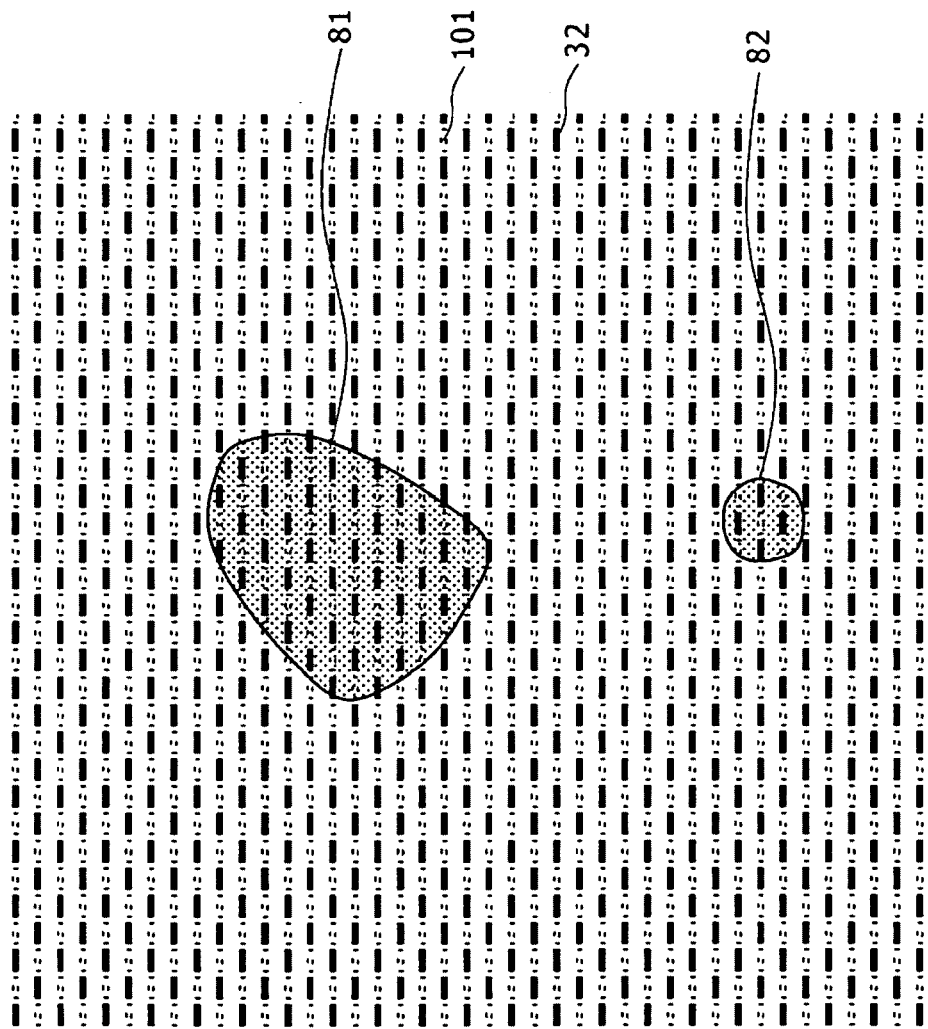
FIG. 21 is an illustration for explaining an effect of an arrangement of the second embodiment.

FIG. 21 illustrates the display panel 25 with the arrangement of FIG. 20 upon which the contact areas 81 and 82 are superimposed, similarly to FIGS. 9 and 12.

In the case of the display panel 25 according to the second embodiment also, a region that surrounds all the light receiving cells 32 included in the contact area 82 is larger than that of FIG. 19. Thus, it can be said that an improvement in the light receiving resolution is achieved in effect by reversing the locations of the light receiving cells 32 and the reference cells 101 between every two adjacent columns.

Therefore, even in the case where the signal processing or the image processing for calculating the location of the center of gravity of the object is performed based on the output from the light receiving cells 32 included in the small contact area 82 on the display panel 25 according to the second embodiment, the result of the calculation obtained is reliable. Needless to say, in the case where the location of the object is calculated based on the output from the light receiving cells 32 included in the large contact area 81 also, the result of the calculation obtained is reliable.

Figure 22:
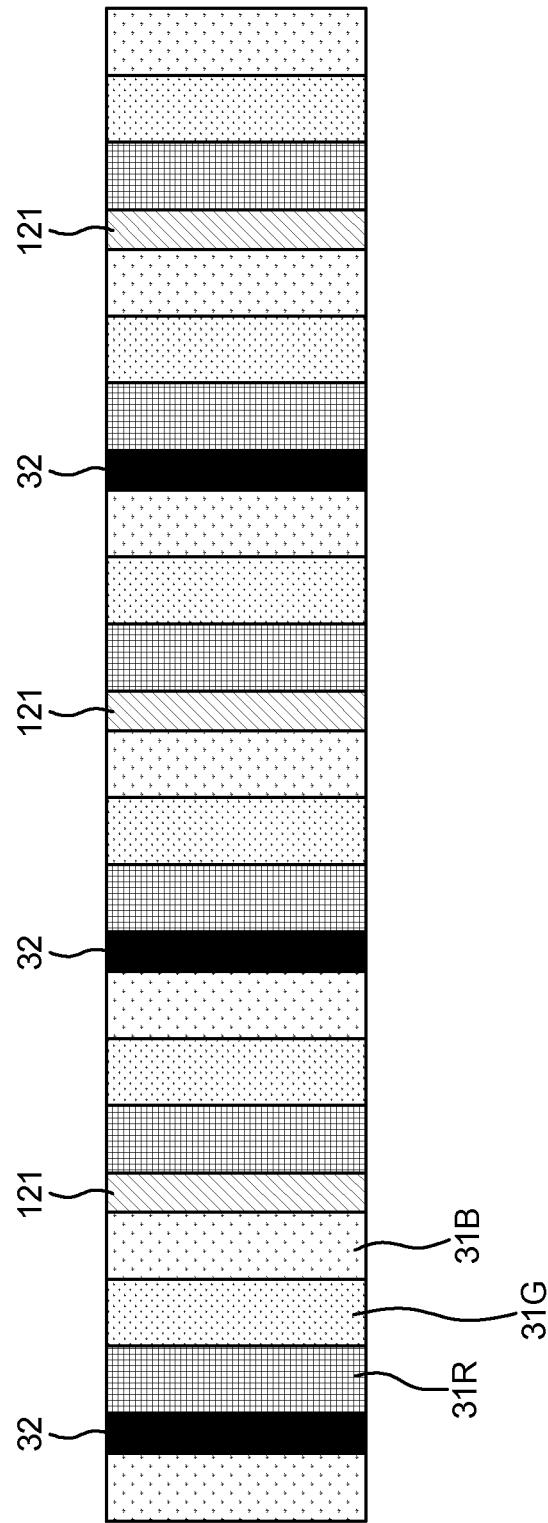
FIGS. 22 and 23 illustrate an exemplary known ½ thinning arrangement using dummy blacks.

FIG. 22 illustrates an exemplary ½ thinning arrangement of one row in which the light receiving cell 32 is arranged on the side of the pixel Pix in the row direction and in which, unlike the first embodiment, dummy blacks 121 are arranged instead of the reference cells 101 (see FIG. 10).

Figure 23:
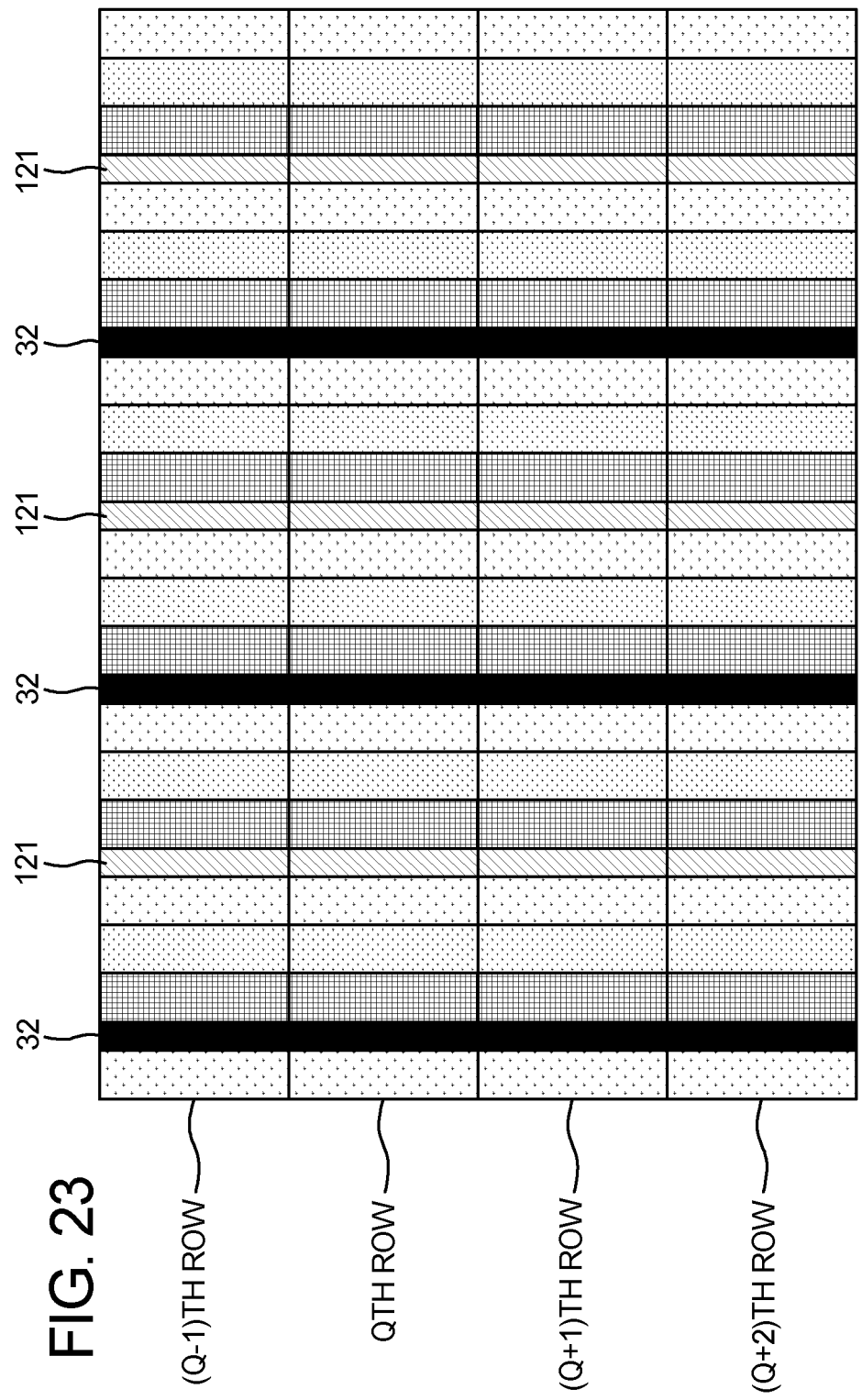

FIG. 23 illustrates an exemplary arrangement of an array obtained by extending the one row as illustrated in FIG. 22 in the column direction. The arrangement of the light receiving cells 32 in this case is identical to that of FIG. 11, and therefore, the number of light receiving cells 32 included in the contact area 82 is extremely small. Therefore, if the calculation of the center of gravity of the object or the image processing is performed based only on the small number of light receiving cells 32 included in the contact area 82, an error relative to the actual location of the object will sometimes be significant.

Figure 24:
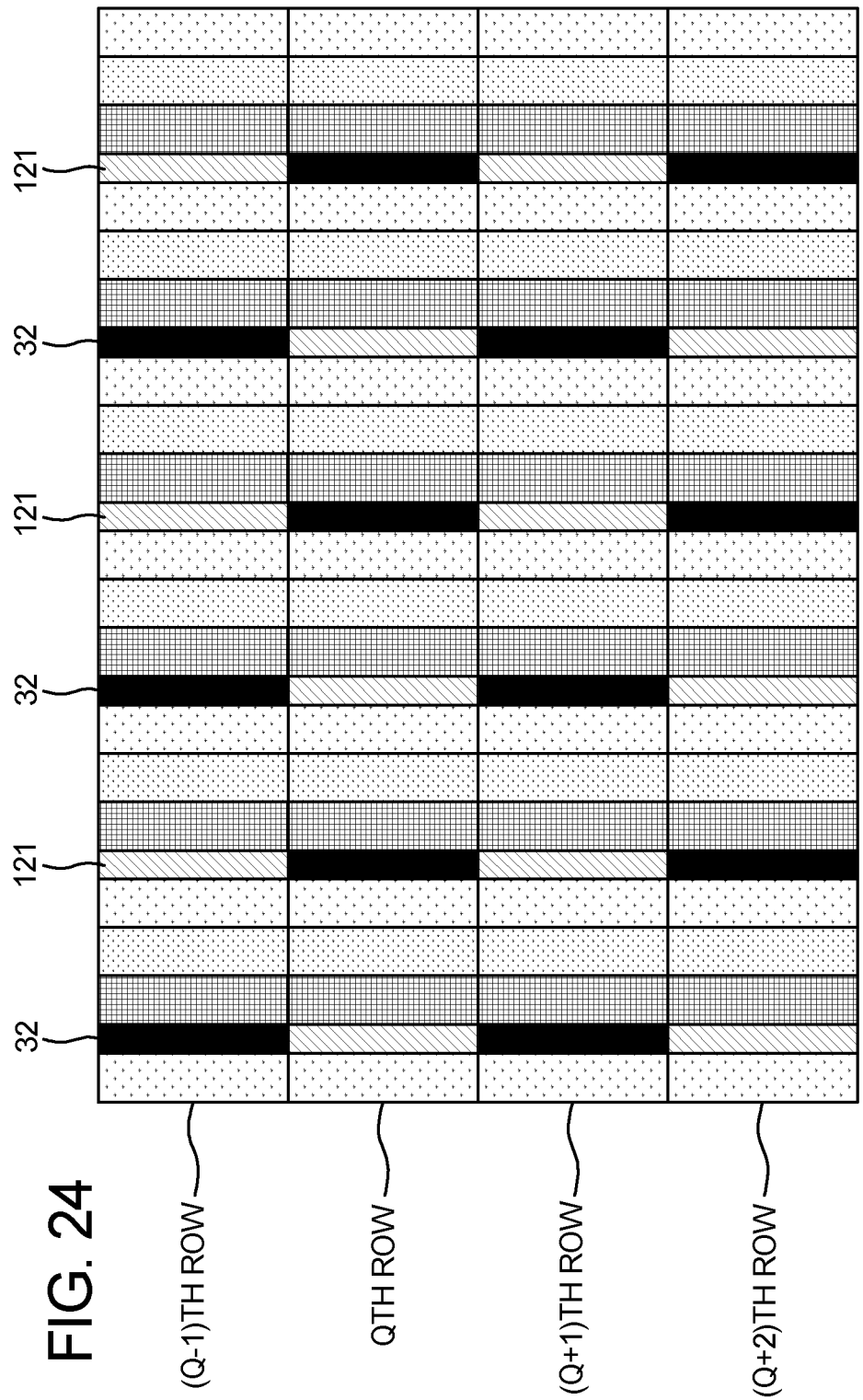
FIG. 24 illustrates a third embodiment of the display panel of the information processing apparatus as shown in FIG. 1.

FIG. 24 illustrates an arrangement of the display panel 25 of the information processing apparatus 1 as shown in FIG. 1 according to a third embodiment. In the arrangement of FIG. 24, the locations of the light receiving cells 32 and the dummy blacks 121 are reversed between every two adjacent rows, similarly to the first embodiment.

According to this arrangement, even when the signal processing or the image processing for calculating the location of the center of gravity of the object is performed based on the output from the light receiving cells 32 included in the small contact area 82, the result of the calculation obtained is reliable. Needless to say, in the case where the location of the object is calculated based on the output from the light receiving cells 32 included in the large contact area 81, the result of the calculation obtained is also reliable.

Next, the cases will be described where the light receiving resolution is lower than half the display resolution, such as a third or a quarter of the display resolution. In the foregoing descriptions of the exemplary ½ thinning arrangements, the embodiments that adopt the basic unit 30, in which the light receiving cell 32 is arranged on the side of and adjacent to the pixel Pix in the row direction, and the embodiments that adopt the basic unit 30', in which the light receiving cell 32 is arranged below and adjacent to the pixel Pix in the column direction, have been described. In the following descriptions, however, only embodiments that adopt the basic unit 30 will be described. It will be appreciated, however, that it is also possible to implement embodiments that adopt the basic unit 30' in a similar manner.

Figure 25:
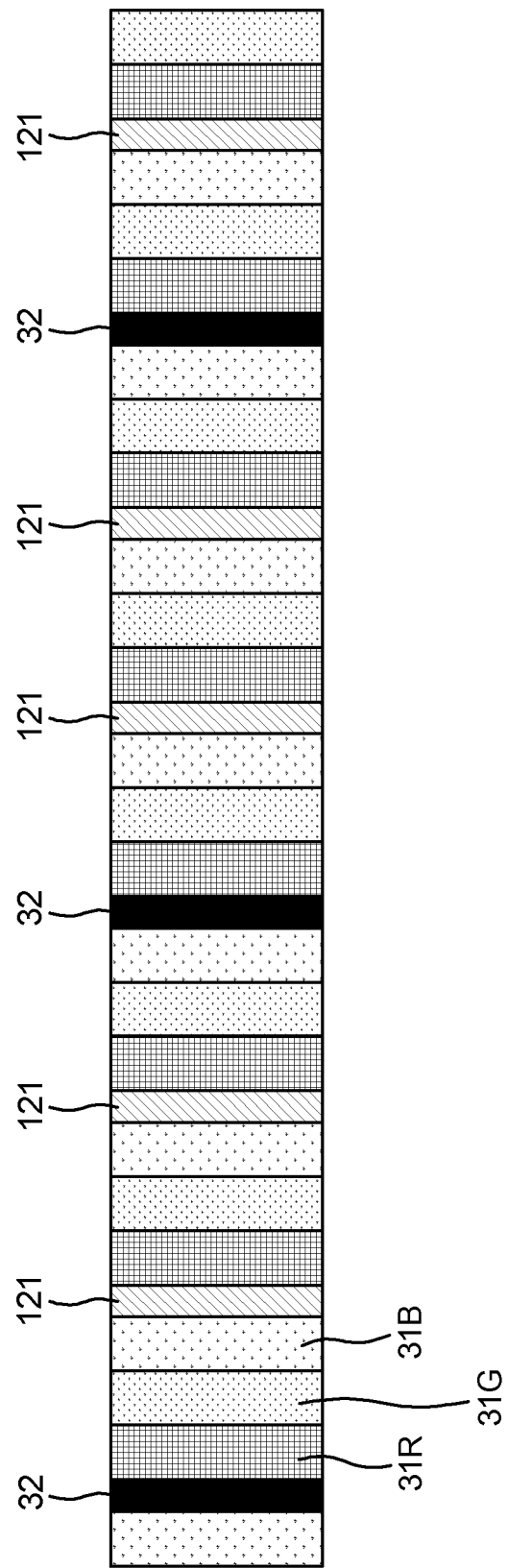
FIGS. 25 and 26 illustrate a fourth embodiment of the display panel of the information processing apparatus as shown in FIG. 1.

FIG. 25 illustrates an arrangement of one row in the case where the light receiving resolution is a third of the display resolution while the light receiving cells 32 and the dummy blacks 121 are used. Regarding the light receiving cells 32 and the dummy blacks 121, a pattern of one light receiving cell 32 and two successive dummy blacks 121 is repeatedly arranged in each individual row.

Figure 26:
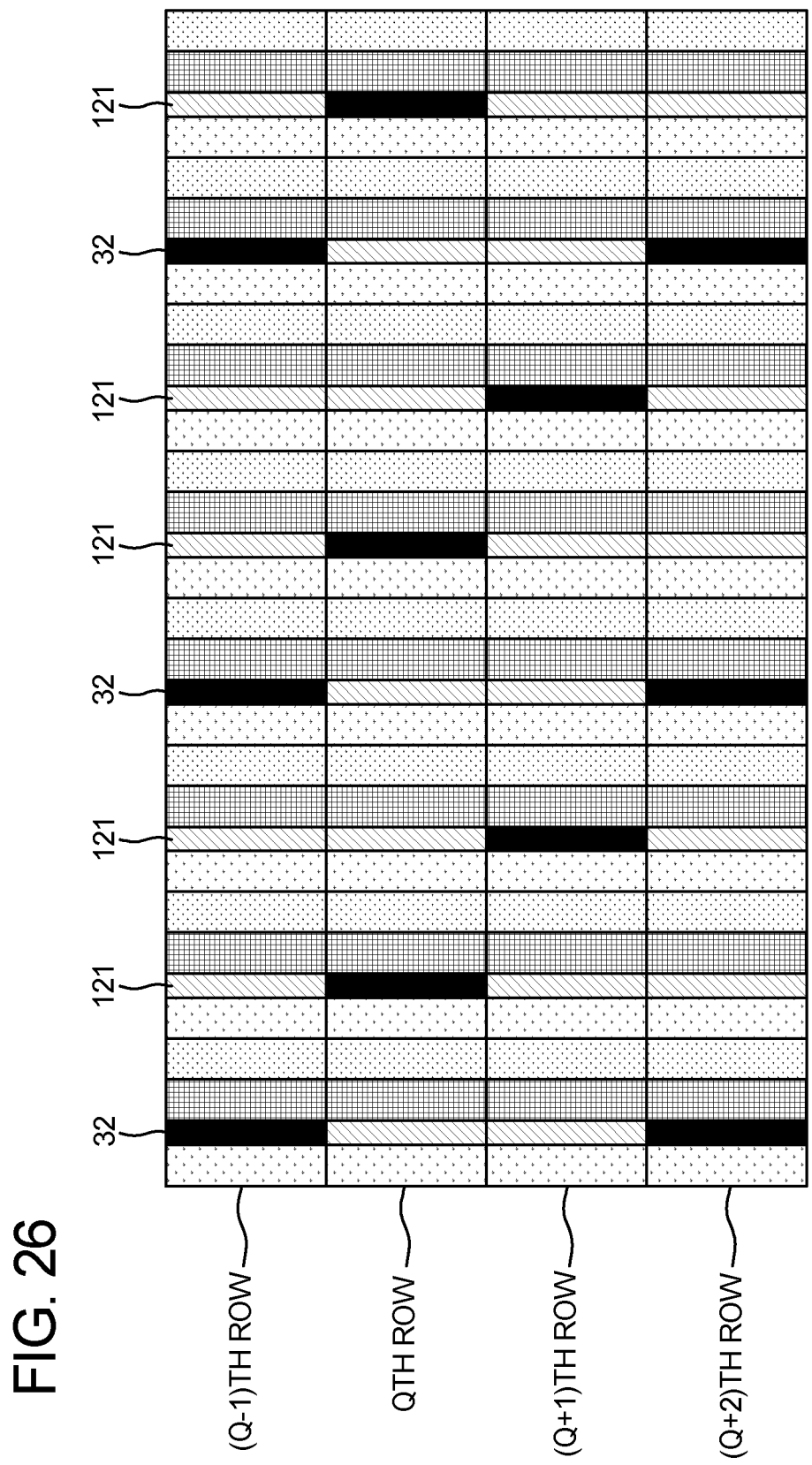

FIG. 26 illustrates a two-dimensional array obtained by extending the row as illustrated in FIG. 25 in the column direction such that, in every three adjacent rows, the light receiving cells 32 are arranged in mutually different columns (the display panel 25 according to a fourth embodiment).

Specifically, in the display panel 25 according to the fourth embodiment, the light receiving cells 32 in the (Q−1)th row are displaced by one column with respect to the light receiving cells 32 in the Qth row, and the light receiving cells 32 in the Qth row are displaced by one column with respect to the light receiving cells 32 in the (Q+1)th row. Further, the light receiving cells 32 in the (Q+1)th row are displaced by one column with respect to the light receiving cells 32 in the (Q+2)th row. Accordingly, the light receiving cells 32 in the (Q+2)th row are arranged in the same columns as the light receiving cells 32 in the (Q−1)th row.

As a result of the above arrangement, an improvement in the light receiving resolution is achieved in effect as with the case of FIG. 14. Thus, even in the case where the signal processing or the image processing for calculating the location of the center of gravity of the object is performed based on the output from the light receiving cells 32 included in the small contact area 82, the result of the calculation obtained is reliable.

Figure 27:
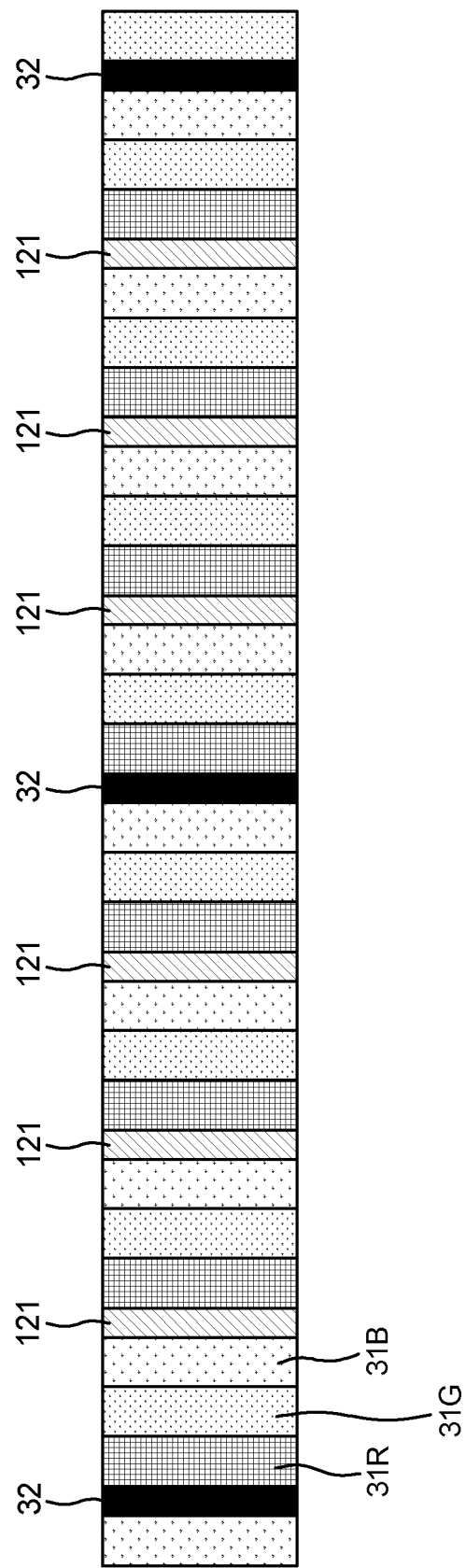
FIGS. 27 and 28 illustrate a fifth embodiment of the display panel of the information processing apparatus as shown in FIG. 1.

FIG. 27 illustrates an exemplary arrangement of one row in the case where the light receiving resolution is a quarter of the display resolution while the light receiving cells 32 and the dummy blacks 121 are used. regarding the light receiving cells 32 and the dummy blacks 121, a pattern of one light receiving cell 32 and three successive dummy blacks 121 is repeatedly arranged in each individual row.

Figure 28:
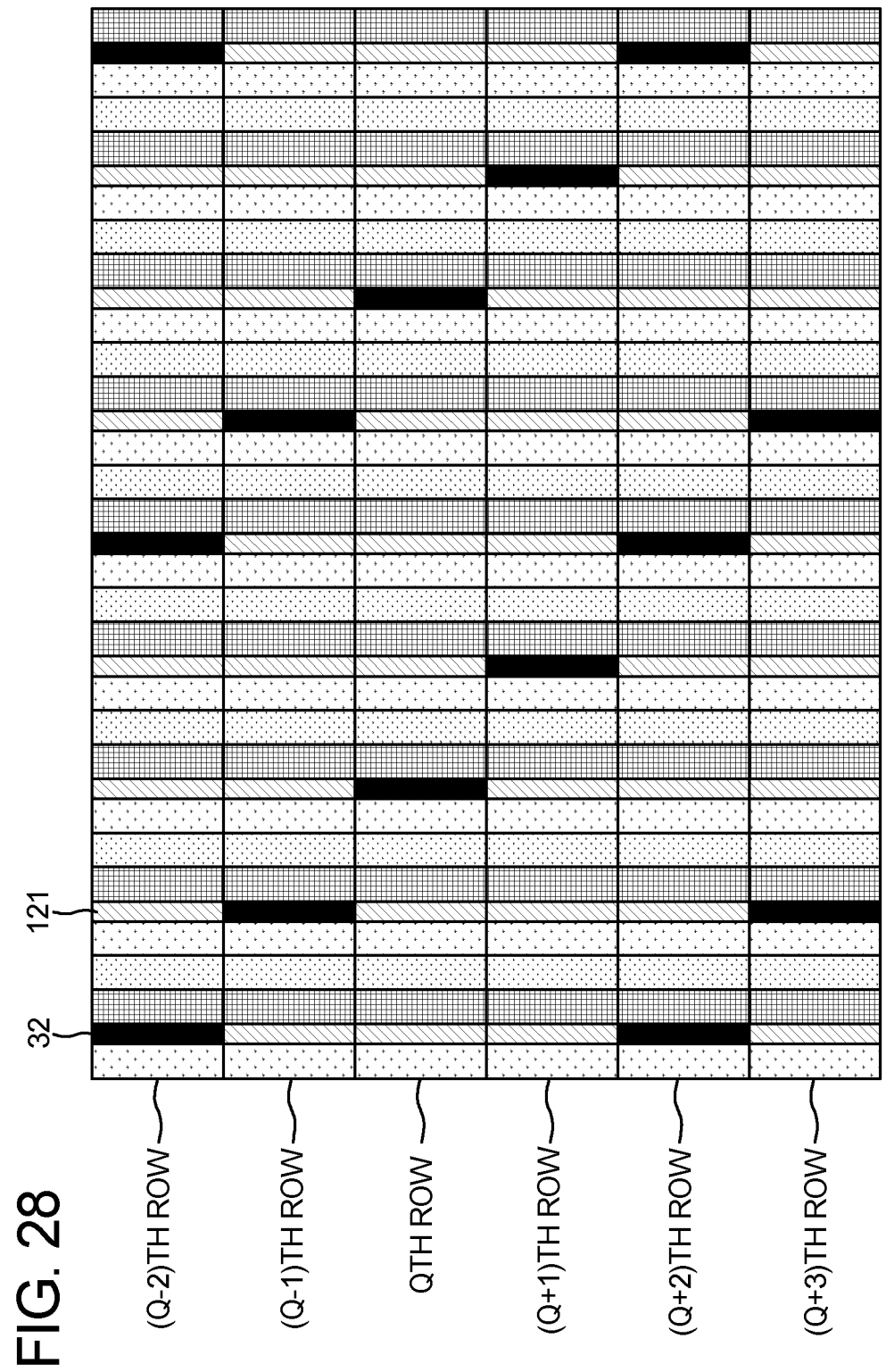

FIG. 28 illustrates a two-dimensional array obtained by extending the row as illustrated in FIG. 27 in the column direction such that, in every four adjacent rows, the light receiving cells 32 are arranged in mutually different columns (the display panel 25 according to a fifth embodiment).

Specifically, in the display panel 25 according to the fifth embodiment, the light receiving cells 32 in a (Q−2)th row are displaced by one column with respect to the light receiving cells 32 in the (Q−1)th row, and the light receiving cells 32 in the (Q−1)th row are displaced by one column with respect to the light receiving cells 32 in the Qth row. Further, the light receiving cells 32 in the Qth row are displaced by one column with respect to the light receiving cells 32 in the (Q+1)th row, and the light receiving cells 32 in the (Q+1)th row are displaced by one column with respect to the light receiving cells 32 in the (Q+2)th row. Accordingly, the light receiving cells 32 in the (Q+2)th row are arranged in the same columns as the light receiving cells 32 in the (Q−2)th row.

As a result of the above arrangement, an improvement in the light receiving resolution is achieved in effect as with the case of FIG. 14. Thus, even in the case where the signal processing or the image processing for calculating the location of the center of gravity of the object is performed based on the output from the light receiving cells 32 included in the small contact area 82, the result of the calculation obtained is reliable.

The exemplary arrangements as illustrated in FIGS. 26 and 28 correspond to ⅓ thinning and ¼ thinning of the light receiving cells 32, respectively. However, because the dummy blacks 121 are placed at locations where the light receiving cells 32 are omitted, the spatial frequency is the same as when the light receiving cells 32 are not thinned. Therefore, the image displayed on the display panel 25 will be perceived by the user to have an image quality equivalent to that when the light receiving cells 32 are not thinned.

Figure 29:
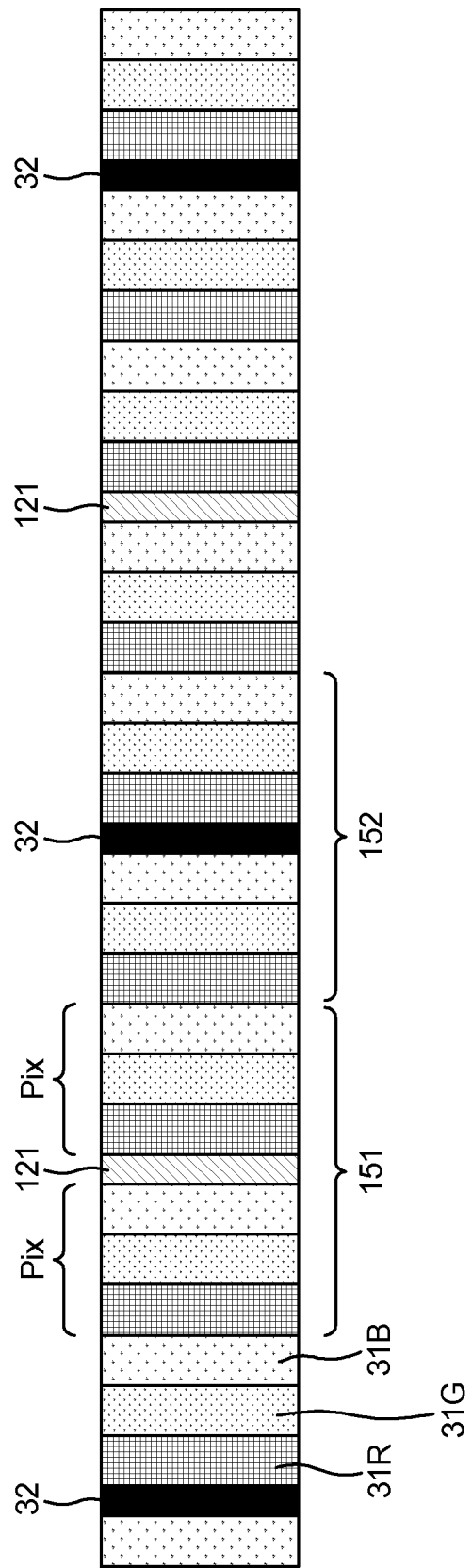
FIGS. 29 and 30 illustrate a sixth embodiment of the display panel of the information processing apparatus as shown in FIG. 1.

FIG. 29 illustrates another exemplary ¼ thinning arrangement of the display panel 25 according to a sixth embodiment.

In FIG. 29, a pair of a unit 151, which is composed of two pixels Pix and one dummy black 121 sandwiched therebetween, and a unit 152, which is composed of two pixels Pix and one light receiving cell 32 sandwiched therebetween, are arranged repeatedly in the row direction.

Thus, one light receiving cell 32 is provided for every four pixels Pix, which means the ¼ thinning, but because the dummy blacks 121 are arranged in locations that are sandwiched by two pixels Pix but in which the light receiving cell 32 is not arranged, the image displayed on the display panel 25 (or the spatial frequency) as perceived by the user will be equivalent to that in the case of the ½ thinning, and the user will not perceive the black stripes.

Figure 30:
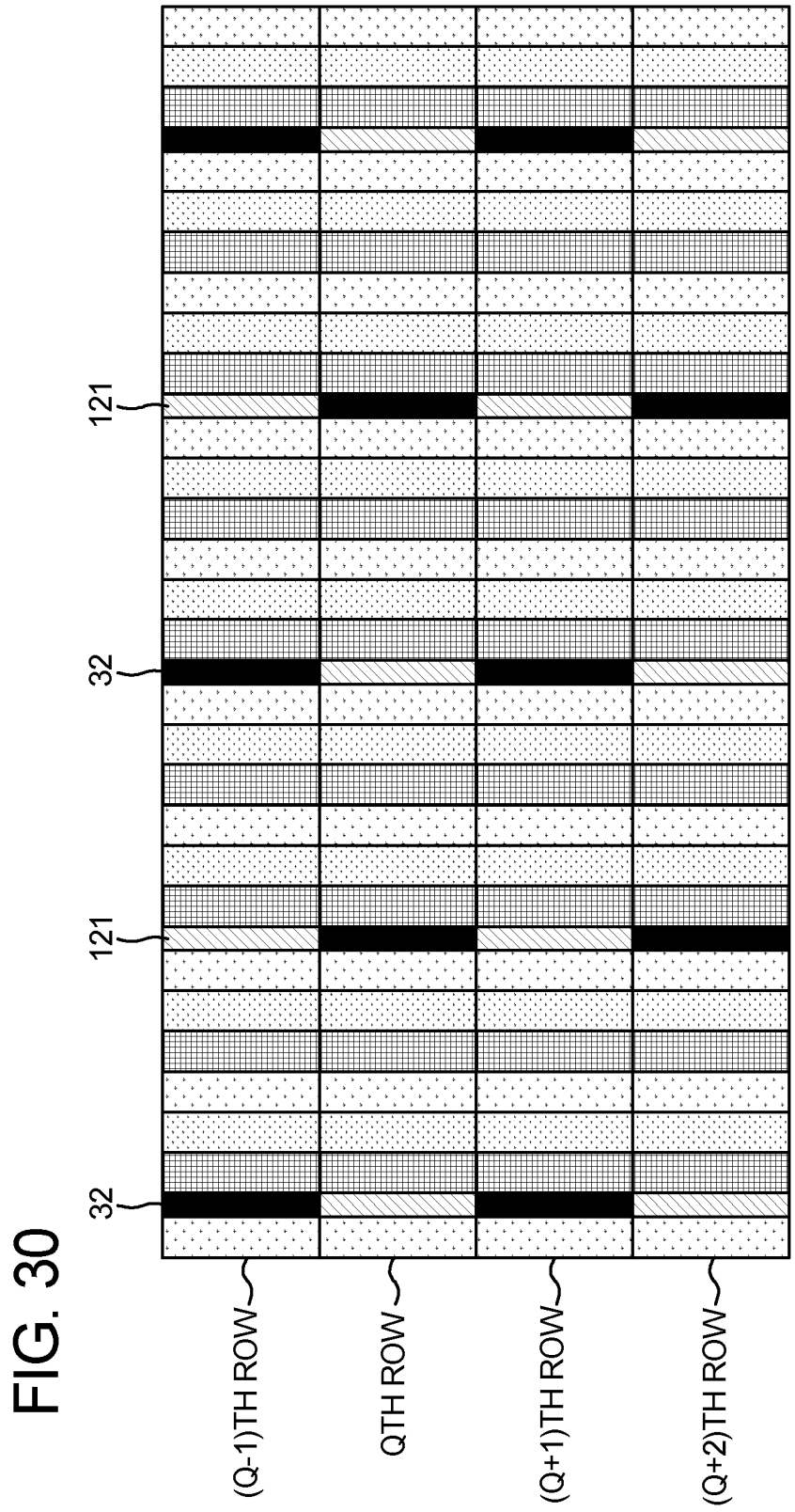

FIG. 30 illustrates an exemplary arrangement of given four rows on the display panel 25 according to the sixth embodiment.

In FIG. 30, the locations of the light receiving cells 32 and the dummy blacks 121 are reversed between the (Q−1)th row and the Qth row, and the locations of the light receiving cells 32 and the dummy blacks 121 are also reversed between the Qth row and the (Q+1)th row. In other words, in the Qth row, the dummy blacks 121 are arranged in the columns in which the light receiving cells 32 are arranged in the (Q−1)th row, whereas in the (Q+1)th row, the dummy blacks 121 are arranged in the columns in which the light receiving cells 32 are arranged in the Qth row.

In the exemplary arrangements as illustrated in FIGS. 25 to 30, the dummy blacks 121 are arranged in the locations where the light receiving cells 32 are omitted. Note, however, that the reference cells 101, instead of the dummy blacks 121, may be arranged in the locations where the light receiving cells 32 are omitted.

Also note that both the reference cells 101 and the dummy blacks 121 may be used.

FIGS. 31 to 36 illustrate exemplary arrangements in which both the dummy blacks 121 and the reference cells 101 are used.

Figure 31:
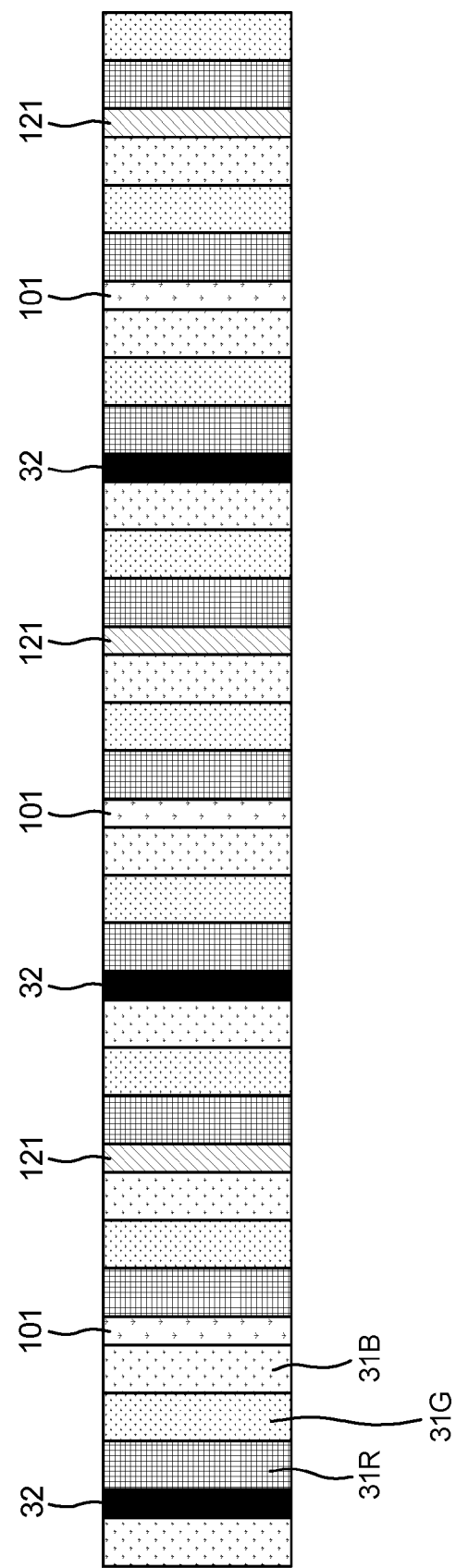
FIGS. 31 and 32 illustrate a seventh embodiment of the display panel of the information processing apparatus as shown in FIG. 1.
Figure 32:
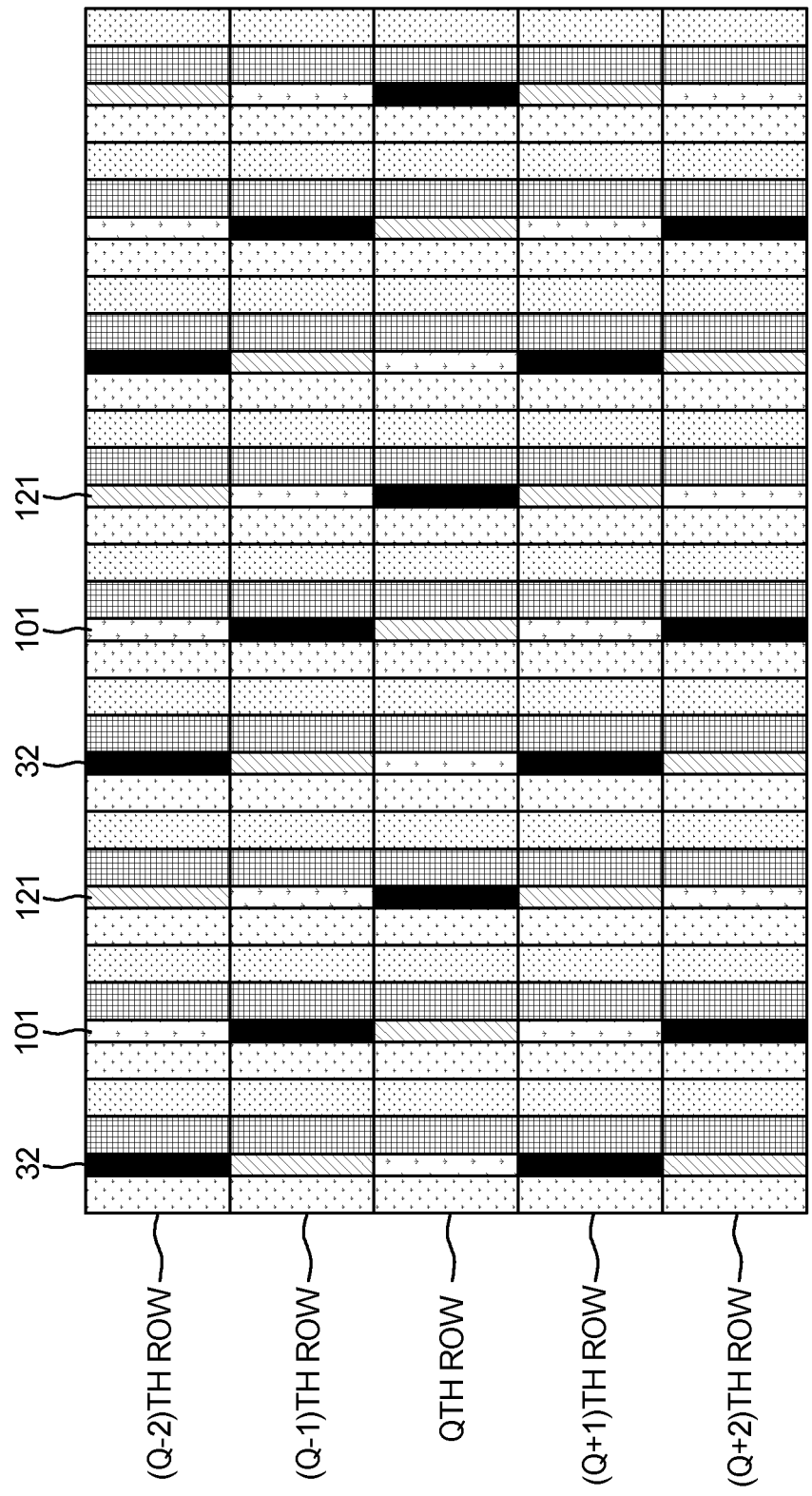

FIGS. 31 and 32 illustrate the display panel 25 according to an seventh embodiment.

FIG. 31 illustrates an exemplary arrangement of one row in the case of the ⅓ thinning using both the dummy blacks 121 and the reference cells 101. As illustrated in FIG. 31, in each row of the display panel 25 according to the seventh embodiment, a pattern of the light receiving cell 32, the reference cell 101, and the dummy black 121 arranged in this order is repeatedly arranged in the row direction in pixel locations corresponding to the color of black in the spatial frequency.

FIG. 32 illustrates an exemplary arrangement of an array on the display panel 25 according to the seventh embodiment. Specifically, the light receiving cells 32 in the (Q−1)th row are displaced by one column with respect to the light receiving cells 32 in the Qth row, and the light receiving cells 32 in the Qth row are displaced by one column with respect to the light receiving cells 32 in the (Q+1)th row. Further, the light receiving cells 32 in the (Q+1)th row are displaced by one column with respect to the light receiving cells 32 in the (Q+2)th row. The light receiving cells 32 in the (Q+2)th row are arranged in the same columns as the light receiving cells 32 in the (Q−1)th row. In the same manner, both the reference cells 101 and the dummy blacks 121 are displaced by one column sequentially between every two adjacent rows.

Figure 33:
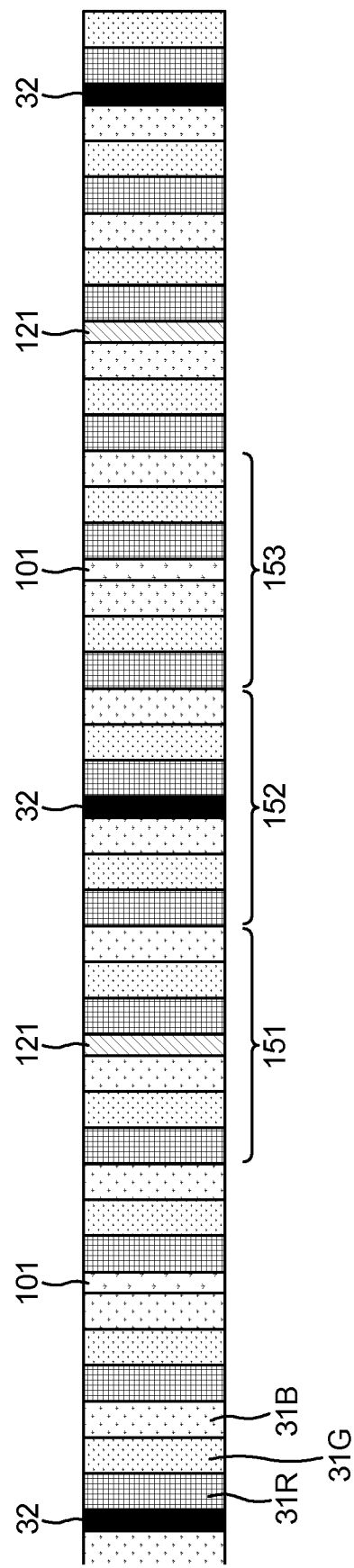
FIGS. 33 and 34 illustrate an eighth embodiment of the display panel of the information processing apparatus as shown in FIG. 1.
Figure 34:
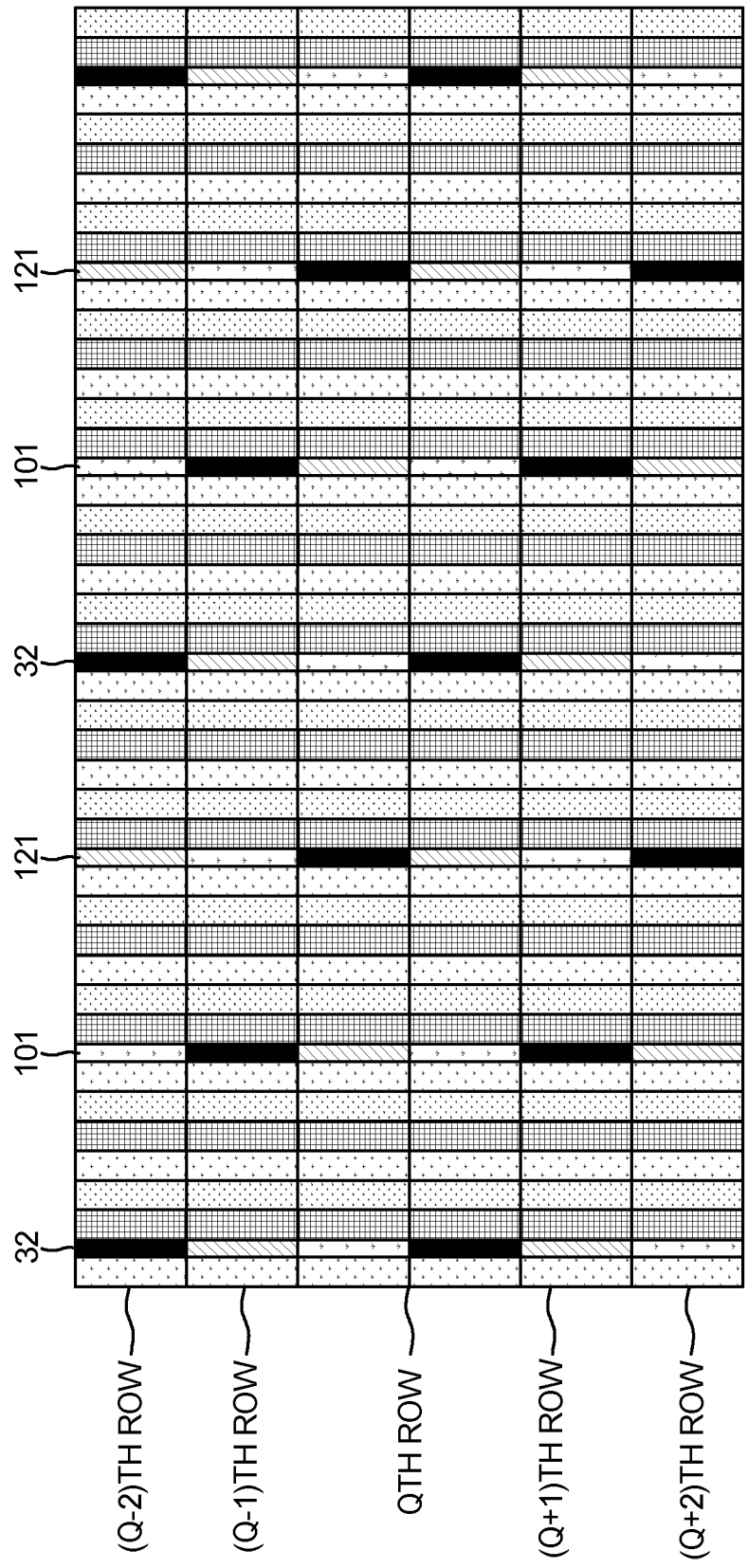

FIGS. 33 and 34 illustrate the display panel 25 according to an eighth embodiment.

FIG. 33 illustrates an exemplary arrangement of one row on the display panel 25 according to the eighth embodiment.

As illustrated in FIG. 33, in each row of the display panel 25 according to the eighth embodiment, a pattern of the unit 151, which is composed of two pixels Pix and one dummy black 121 sandwiched therebetween, the unit 152, which is composed of two pixels Pix and one light receiving cell 32 sandwiched therebetween, and a unit 153, which is composed of two pixels Pix and one reference cell 101 sandwiched therebetween, is repeatedly arranged in the row direction.

FIG. 34 illustrates an exemplary arrangement of an array on the display panel 25 according to the ninth embodiment. As illustrated in FIG. 34, the row as illustrated in FIG. 33 is repeatedly arranged in the column direction such that the units 151, 152, and 153 are displaced by one between every two adjacent rows. In this arrangement, the light receiving resolution is a sixth of the display resolution, but because of the presence of the dummy blacks 121 and the reference cells 101, the image displayed on the display panel 25 (or the spatial frequency) will be perceived by the user to have an image quality equivalent to that in the case where the light receiving resolution is half the display resolution.

Figure 35:
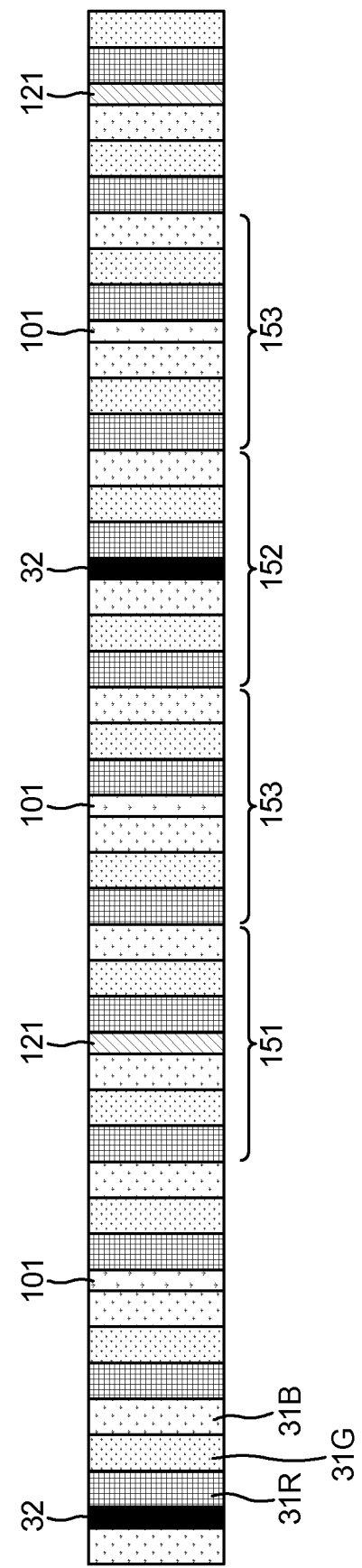
FIGS. 35 and 36 illustrate a ninth embodiment of the display panel of the information processing apparatus as shown in FIG. 1.
Figure 36:
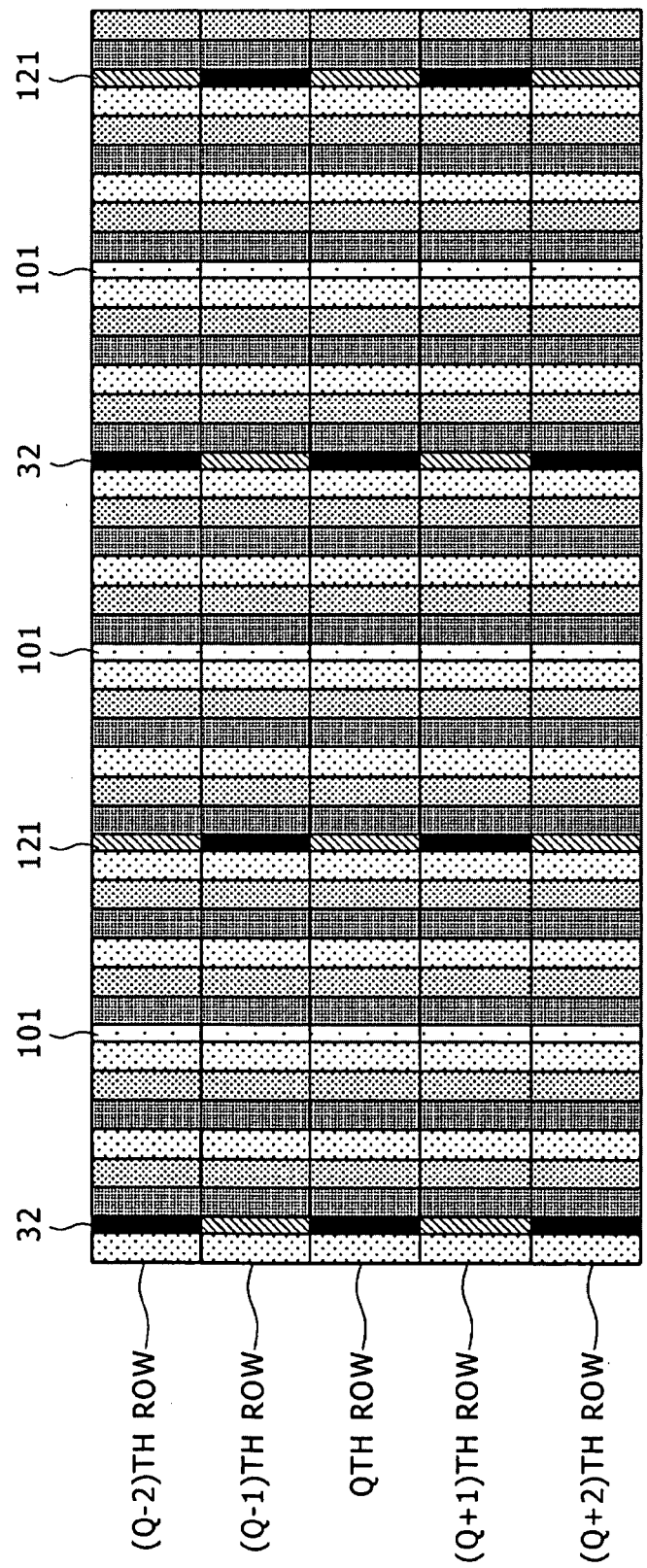

FIGS. 35 and 36 illustrate the display panel 25 according to a ninth embodiment.

FIG. 35 illustrates an exemplary arrangement of one given row on the display panel 25 according to the ninth embodiment. As illustrated in FIG. 35, in one given row on the display panel 25 according to the ninth embodiment, a pattern of the units 151, 153, 152, and 153 is repeatedly arranged in the row direction.

FIG. 36 illustrates an exemplary arrangement of an array on the display panel 25 according to the ninth embodiment. As illustrated in FIG. 36, a pattern of two rows composed of one row as illustrated in FIG. 35 and one row in which the units 151 and 152 are reversed in arrangement compared to the row as illustrated in FIG. 35 is repeatedly arranged in the column direction.

The exemplary arrangement as illustrated in FIG. 36 corresponds to 1/8 thinning, but has a spatial frequency equivalent to that in the case of the 1/2 thinning. Therefore, the image displayed on the display panel 25 according to the ninth embodiment will be perceived by the user to have the same image quality as in the case of the 1/2 thinning.

Note that, as in the exemplary arrangement of FIG. 34, the row as illustrated in FIG. 35 may be repeatedly arranged in the column direction such that the units 151, 153, 152, and 153 are displaced by one between every two adjacent rows. Also note that the pattern may be include two units 151, instead of two units 153.

The following is a summary of the above-described arrangements of the light receiving cells 32 that enable accurate detection of the location of the detection target object even when the light receiving resolution is lower than the display resolution.

It is assumed here that X represents the amount of displacement in the row direction of the light receiving cells 32 between every two adjacent rows, and Y represents the pitch of the light receiving cells 32 in the same row. Then, X and Y satisfy the following relationship: $X=Y/\alpha$ ($\alpha$ is an integer greater than 1).

Figure 37:
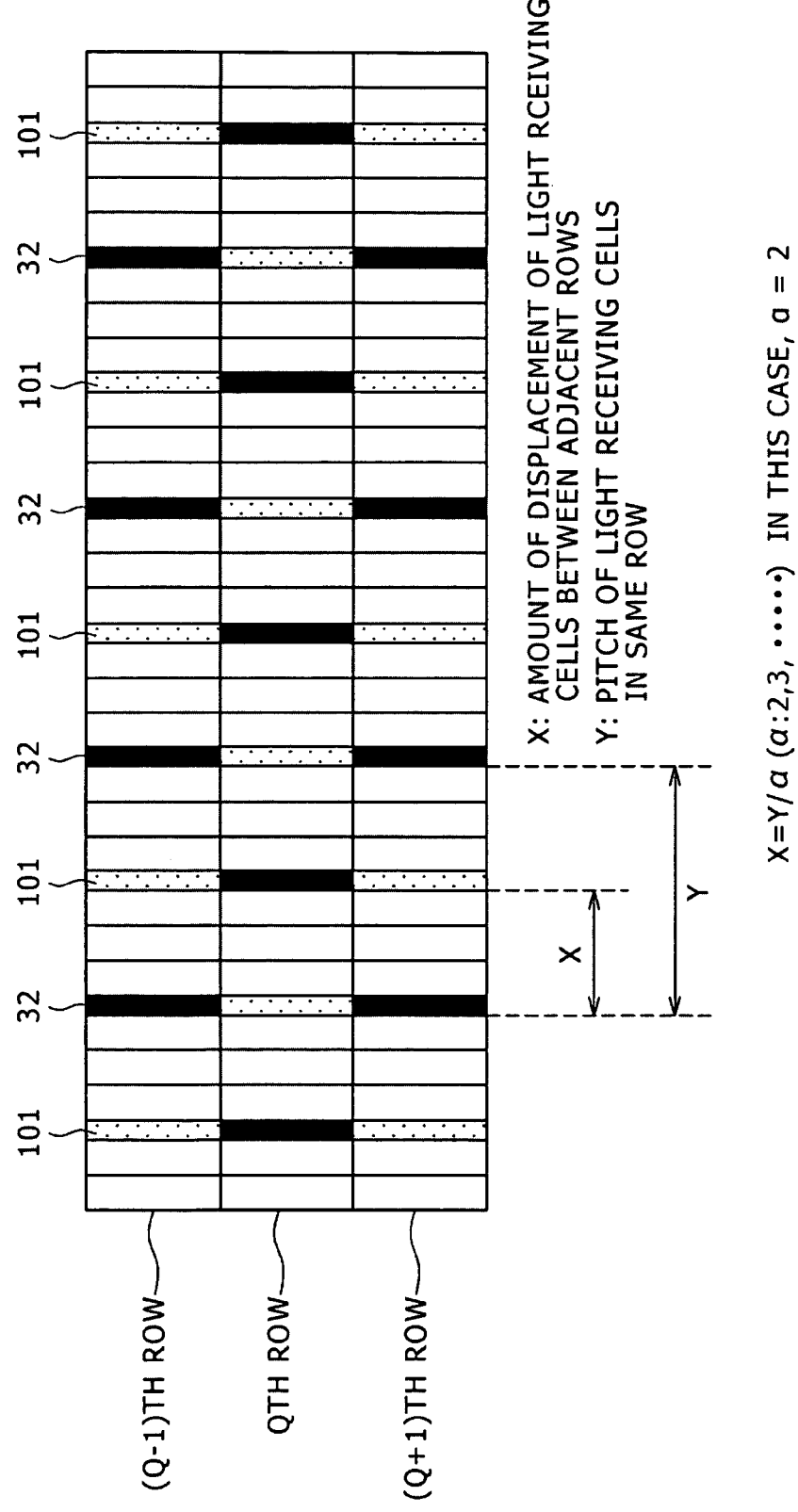

FIG. 37 illustrates an exemplary 1/2 thinning arrangement, similar to that of FIG. 13. In this case, the amount X of displacement of the light receiving cells 32 and the pitch Y of the light receiving cells 32 satisfy the following relationship: $X Y/2$.

FIG. 38 illustrates an exemplary 1/3 thinning arrangement, similar to that of FIG. 26. In this case, the amount X of displacement of the light receiving cells 32 and the pitch Y of the light receiving cells 32 satisfy the following relationship: $X=Y/3$.

FIG. 39 illustrates an exemplary 1/4 thinning arrangement, similar to that of FIG. 30. In this case, the amount X of displacement of the light receiving cells 32 and the pitch Y of the light receiving cells 32 satisfy the following relationship: $X=Y/2$.

Note that in the case of the display panel 25 on which the basic units 30' are arranged also, similar relationships are satisfied. That is, on the assumption that X represents the amount of displacement in the column direction of the light receiving cells 32 between every two adjacent columns, and Y represents the pitch of the light receiving cells 32 in the same column, X and Y satisfy the following relationship: $X=Y/\alpha$.

As described above, in the case where the light receiving cells 32 are arranged in the display panel 25 such that the light receiving resolution becomes lower than the display resolution, the light receiving cells 32 may be displaced (in the row direction) between adjacent rows. This enables the accurate detection of the location of an object (i.e., a detection target object) even with a small contact area. In other words, even when the light receiving resolution is lower than the display resolution, it is possible to accurately detect the location of the object (i.e., the detection target object) with a small contact area.

In the display processing section 14, the load on the signal processing and the image processing in the input information analysis block 27 in a stage subsequent to the display panel 25 is reduced by making the light receiving resolution lower than the display resolution.

Moreover, by making the light receiving resolution lower than the display resolution and arranging the reference cells 101 in the locations where the light receiving cells 32 are omitted, it is made possible to cancel the noise caused by the reflected light within the display panel 25, thereby improving the SN ratio.

Alternatively, by making the light receiving resolution lower than the display resolution and arranging the dummy blacks 121 in the locations where the light receiving cells 32 are omitted, it is made possible to prevent the user from perceiving the black stripes that might otherwise appear due to the reduction in the light receiving resolution (i.e., to improve the image quality).

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display apparatus, comprising:
    a plurality of display cells each having a display circuit, a predetermined number of adjacent display cells composing a display pixel;
    a plurality of light receiving cells each having a photosensor configured to receive light from an outside; and
    a plurality of display signal lines, wherein,
    said display cells and said light receiving cells are arranged in a row direction perpendicular to said display signal lines and in a column direction parallel with said display signal lines,
    said light receiving cells in each row are (i) displaced in the row direction between light receiving cells in each adjacent row in a column direction and (ii) adjacent to at least one of a dummy black pixel and a reference cell pixel, wherein each dummy black pixel and reference cell pixel is formed with a black mask, a pattern of a first unit which is composed of two display pixels and one light receiving cell sandwiched therebetween, and at least one of a second unit which is composed of two display pixels and one dummy black pixel sandwiched therebetwen and a third unit which is composed of two display pixels and one reference cell pixel sandwiched therebetween, is arranged repeatedly in the row direction, and said first units in each row are displaced in the row direction between first units in each adjacent row in a column direction.

2. The display apparatus according to claim 1, wherein, with respect to every two adjacent rows in the column direction, each of said light receiving cells in one of the two adjacent rows is placed at a midpoint location between two of said light receiving cells that are adjacent to each other in the row direction in the other of the two adjacent rows.

3. The display apparatus according to claim 1, wherein, with respect to every two adjacent rows in the column direction, said light receiving cells in each row are placed in mutually opposite locations in the row direction.

4. The display apparatus according to claim 1, further comprising reference cell pixels arranged in addition to said display cells and said light receiving cells, each of said reference cell pixels being arranged adjacent to at least one of said light receiving cells and having a photosensor configured to receive only reflected light within the display apparatus.

5. The display apparatus according to claim 1, further comprising dummy black pixels arranged in addition to said display cells and said light receiving cells, each of said dummy black pixels being arranged adjacent to at least one of said light receiving cells and functioning as a dark section that does not emit light.

6. The display apparatus according to claim 1, wherein a pitch Y of said light receiving cells in each row and an amount X of displacement in the row direction of said light receiving cells between every two adjacent rows in the column direction satisfy $X=Y/\alpha$ where $\alpha$ is an integer greater than 1.

7. A display apparatus, comprising:

a plurality of display cells each having a display circuit, a predetermined number of adjacent display cells composing a display pixel;

a plurality of light receiving cells each having a photosensor configured to receive light from an outside; and a plurality of display signal lines, wherein, said display cells and said light receiving cells are arranged in a row direction perpendicular to said display signal lines and in a column direction parallel with said display signal lines, said light receiving cells in each column are (i) displaced in the column direction between light receiving cells in each adjacent column in a row direction and (ii) adjacent to at least one of a dummy black pixel and a reference cell pixel, wherein each dummy black pixel and reference cell pixel is formed with a black mask, a pattern of a first unit which is composed of two display pixels and one light receiving cell sandwiched therebetween, and at least one of a second unit which is composed of two display pixels and one dummy black pixel sandwiched therebetween and a third unit which is composed of two display pixels and one reference cell pixel sandwiched therebetween, is arranged repeatedly in the column direction, and said first units in each column are displaced in the column direction between first units in each adjacent row in a row direction.

8. The display apparatus according to claim 7, wherein, with respect to every two adjacent columns in the row direction, each of said light receiving cells in one of the two adjacent columns is placed at a midpoint location between two of said light receiving cells that are adjacent to each other in the column direction in the other of the two adjacent columns.

9. The display apparatus according to claim 7, wherein, with respect to every two adjacent columns in the row direction, said light receiving cells in each column are placed in mutually opposite locations in the column direction.

10. The display apparatus according to claim 7, further comprising reference cell pixels arranged in addition to said display cells and said light receiving cells, each of said reference cell pixels being arranged adjacent to at least one of said light receiving cells and having a photosensor configured to receive only reflected light within the display apparatus.

11. The display apparatus according to claim 7, further comprising dummy black pixels arranged in addition to said display cells and said light receiving cells, each of said dummy black pixels being arranged adjacent to at least one of said light receiving cells and functioning as a dark section that does not emit light.

12. The display apparatus according to claim 7, wherein a pitch Y of said light receiving cells in each column and an amount X of displacement in the column direction of said light receiving cells between every two adjacent columns in the row direction satisfy $X=Y/\alpha$ where $\alpha$ is an integer greater than 1.

\* \* \* \* \*